(12) United States Patent
Mathias et al.

(10) Patent No.: US 7,788,120 B2
(45) Date of Patent: Aug. 31, 2010

(54) METHOD AND SYSTEM FOR INTERFACING CLIENTS WITH RELATIONSHIP MANAGEMENT (RM) ACCOUNTS AND FOR PERMISSIONING MARKETING

(75) Inventors: Peter F. Mathias, Phoenix, AZ (US);
Paris De L'Etraz, London (GB)

(73) Assignee: Mathias and Co., Inc., Phoenix, AZ (US)

( * ) Notice: Subject to any disclaimer, the term of this patent is extended or adjusted under 35 U.S.C. 154(b) by 0 days.

(21) Appl. No.: 11/415,125

(22) Filed: May 2, 2006

(65) Prior Publication Data

US 2006/0229943 A1    Oct. 12, 2006

Related U.S. Application Data

(62) Division of application No. 09/833,065, filed on Apr. 12, 2001, now abandoned.

(51) Int. Cl.
*G06F 17/30* (2006.01)
(52) U.S. Cl. ........................................................ 705/7
(58) Field of Classification Search ..................... 705/7, 705/8
See application file for complete search history.

(56) References Cited

U.S. PATENT DOCUMENTS

| 5,227,874 | A  | * | 7/1993 | Von Kohorn ................. 705/10 |
| 5,761,432 | A  |   | 6/1998 | Bergholm et al. |
| 6,622,126 | B1 | * | 9/2003 | McArdle et al. .............. 705/26 |
| 6,694,316 | B1 | * | 2/2004 | Langseth et al. ............. 707/10 |
| 6,718,310 | B1 | * | 4/2004 | Fuisz et al. ................... 705/26 |
| 2003/0018514 | A1 | * | 1/2003 | Billet et al. ................... 705/10 |

OTHER PUBLICATIONS

Dialog reference. File 635 #0502934 Cindy Padnos, Scopus Introduces Sales Team for enterprise-wide sales and marketing, Business Wire, Jun. 13, 1994.

* cited by examiner

*Primary Examiner*—Romain Jeanty
*Assistant Examiner*—Raquel Alvarez
(74) *Attorney, Agent, or Firm*—Morrison & Foerster LLP

(57) ABSTRACT

A system and method for interfacing a client with a client relationship management (RM) account database. The client RM account database includes an entry for the client, and the entry for the client includes a fields of data. The RM provides an environment for product and relationship management to jointly conduct client analysis, planning and delivery in a coordinated and measurable fashion. The RM includes user terminals for use by relationship managers and product managers. A network communicatively couples the user terminals, which is in turn coupled to a server.

8 Claims, 46 Drawing Sheets

600

604

|  | Home Country | | | . . . | | | Country N | | |
|---|---|---|---|---|---|---|---|---|---|
|  | Total Wallet | Revenue | % of Wallet | Total Wallet | Revenue | % of Wallet | Total Wallet | Revenue | % of Wallet |
| Product / Service | 100 | 10 | 10.0% | | | | | | |
| . . . | | | | | | | | | |
| Product / Service | | | | | | | | | |

We believe that we are unique in the industry, in being able to provide specialized expertise with a genuine, pragmatic solution. We consider ourselves specialists in these types of projects. No other solutions provider is able to combine:

- A thorough understanding of global commercial and investment banking.
- A true enterprise information platform for managing clients.
- A truly unique systems integration architecture (MCMS Core Services Layer "CSL") capable of bringing disparate systems together.
- E-commerce expertise including an enterprise Web solutions and Knowledge Management track record Mathias Client Management Software (MCMS) represents a unique combination of business consultants, software implementation consultants and systems developers to bring to bear highly focussed and expert solutions in this niche.

The MCMS team draws on many years working with and advising top tier banks, particularly on global relationship banking strategies. The software team specializes in systems integration and deploying successful global projects.

Our software has been continuously refined, with over four years of experience in an operational environment on a worldwide scale.

Slide 2

FIG. 20

The Institutional Banking Value Chain is also facing Changes as a result of Internet Initiatives

| Value Chain | Capital Creation | Capital Distribution | Capital Re-Distribution |
|---|---|---|---|
| Market | Investment Banking | Primary Institutional And Proprietary | Secondary Institutional and Proprietary |
| Product | Origination M&A | IPO's Syndications, etc | Equities, FI, FX |

The Bulge Bracket firms are extending into the Retail value chain (e.g. Goldman Sachs)

The Retail firms are also extending up the value chain (e.g. Charles Schwab)

FIG. 24

Disruption: The New Reality

- In the past Client Management methodologies and enabling technologies (SFA, CRM, etc.) were part of a sustaining effort in order to make existing structures more efficient.

- Today the Internet is Disrupting our present structures and even changing our clients buying behavior

- This new reality demands an event-driven approach to client management methodologies, architecture and enterprise platforms both internally and externally towards our clients

FIG. 25

The ability of Investment Banks to succeed will be very dependent on 3 key new Differentiators:

- Connectivity- Internal and external, the responsiveness of the event-driven enterprise.
- Managing relationships on the Internet- This is a process.
- Branding- The Internet is about trust.

The nature of your "Internet Business" will be a function of how well you manage your online client relationships.

Your effectiveness is based on trust, their ability to "connect" with your capabilities and your ability to effectively respond to their needs.

FIG. 26

Permissioning

- Permissioning involves establishing an interactive dialogue with your client in which the client is giving you permission to market to him and is willing to collaborate with you in this process

- The objective of this collaboration is to increase the level of permissioning to the point where you influence your clients buying behavior. At that point permission turns into revenues.

FIG. 27 eClient Management

- eClient Management is a pro-active, internet enabled, relationship management process based on increasing the level of permissioning with the client in order to maximize overall returns.

- eClient Management changes the way you focus internally on your clients, it makes it happen.

- eClient Management demands that internal structures, platforms and practices are aligned with the external face to the client.

FIG. 28 eCM and Traditional Relationship Management

Traditional RM Issues

- Lacks transparency and accountability
- Roles not clearly defined
- Product people usually consider it to be an internal process, very far away from the client.
- Not integral to the real origination function eCM Realities

- Transparent and the client expects accountability (no where to run, no where to hide)
- Roles must be clearly defined
- This is a process which includes the client.
- Very much part of the origination process.

In eCM, you cannot afford not to put the "A Team" in charge of the Relationship Management function

FIG. 29

Share-of-Mind Permissioning

- There is an excess of intellectual capital today available to clients of Investment Banks.

- In the future, all companies that enable and control client contact will try to control every profitable service. Client relationships, based on "permission to engage" will be more valuable than ever before.

- A "share of mind" dialogue with clients is more valuable today then it was in the past. Getting CEO attention in the form of a strategic dialogue, outside of his "day window", facilitated by the Internet, is what share of mind permissioning is all about.

FIG. 30

Share-of-Mind Permissioning (SMP) cont'd

- By anticipating and initiating actions to meet client needs the firm will be in a privileged position vis-à-vis its competition. As a firm we must be able to Web-enable 100% of our products and services if that is what clients demand. Obtaining "permission" to sell to our clients must be backed up with a fully integrated "One Bank" Web capability.

- Share-of-mind Permissioning is about engaging new clients in a cost effective share of mind discussion platform as well as wiring up existing clients for a greater share of their share of mind revenues across all our IB products.

FIG. 31

Going up the Permissioning Ladder online

The Internet facilitates a Share-of-mind Permissioning Program.
The Objective of this program is to move The clients up the Permissioning ladder.

Stages of Share-of-mind Permissioning:

- Brand Trust – It creates awareness for the Bank. While the client recognizes the bank, he/she is not being recognized online.
- Opportunistic – The Client gets a "view" of his business with the Bank. The Bank acts opportunistically but is unable to wire up the client in any particular area.
- Tactical – The client feels he is getting some "goodies" in a particular product line. The Bank has product superiority online in a particular area but is being optimized by the client as this is not a multi-product relationship.
- Strategic – The Bank is almost making the buying decisions on behalf of the client. The Client saves time and money, he feels he is getting "best in class". Many times the client prefers the Bank to make choices for him.

The level of Permissioning is driven by the ability of the Bank to institutionalize a level of interaction with the client on the Internet. ( e.g. stage of eCM )

FIG. 32

Stages of eCM

- Stage 1 - This is a catalog of services approach where the IB can post information on its product offerings, research can be distributed, contact information, essentially one-way, read only by client.
(CREATE AWARENESS)

- Stage 2 - The "Client Center" approach is like the catalog of services but "personalized" for the client. It can include access to relevant research, summary transaction information, etc., read only by client.
(PROVIDE CONTEXT as well as CONTENT for client)

- Stage 3 - This is the Client Center approach with a two-way "dialogue" for some Lines of Business (LOBs) but where each LOB acts independently without providing a "One Bank" delivery.
(LIMITED INTERACTIVE CONTEXT MARKETPLACE)

- Stage 4 – This stage is the full "Client Strategy Center" where there is complete alignment of client coverage, account management and planning, product execution and delivery. The Bank and client have the full view of each other's relationship and value proposition.
(FULL INTERACTIVE CONTEXT MARKETPLACE)

FIG. 33 eCM and Permissioning Correlation

| eCM Stage | Permissioning Level | Risks | Rewards |
|---|---|---|---|
| I | Brand Trust | High, Competition Is not asleep | Low |
| II | Opportunistic | High, Competition Is not asleep | Average |
| III | Tactical | High, Need strict discipline | Limited High |
| IV | Strategic | High, Need strict discipline | High |

FIG. 35

The eCM Toolkit

- In the Share-of-mind business, the client wants you to know him well. He wants you to do your homework on him before you make the call. The better your "view" on him the greater permissioning he will give you in order to progress your Share-of-mind dialogue.

- Communication and follow up are critical to a strategic dialogue with your clients. The Internet is posed to change the way we all communicate in the future.

- The eCM toolkit (IPO) is a series of communication tools that facilitate the increase in your level of permissioning with your client.

FIG. 36

The eCM ToolKit and the Client

- The Toolkit must make the client feel smart and in control.

- The client must feel safe, very safe.

- Every interaction with the client must be anticipated, personal, relevant and unique to him or her.

- Every module in the toolkit must:
  a) have elements that take place over time
  b) promote a response from the client which keeps communication moving forward
  c) have a final call to action so that we can measure results

- As soon as a new level of Permissioning is reached then a new element within a module engages the client in order to re-inforce the process.

FIG. 37

The eCM ToolKit and the Client, cont'd

- We must continuously measure the activity around the Toolkit module elements.

- We must measure how achieving new levels of permissioning with new Toolkit modules engaged, alters client buying behaviour.

- We must resist short-term profiteering on behalf of the main coverage person, in pursuit of extending the level of permissioning from the client.

- The Coverage person's main role is to increase the level of share-of-mind permissioning.

FIG. 38

The eCM Relationship Management Process

Each stage of eCM requires a particular approach to:

- Segmentation of clients
- Client Coverage Model
- Opportunity Analysis
- Product Management
- New Product Development
- Knowledge Management This Process is different to traditional Relationship Management Processes because the intensity of the Relationship Management is different for increasing levels of Permissioning, requiring greater transparency and accountability.

FIG 39

Developing an eCM Program
(Permissioning Program)

- Decide on an eCM stage Strategy.
- Define your Knowledge Management and Mapping requirements
- Institutionalize the eCM Relationship Management requirements.
- Define the ToolKit "footprint" for your Bank.
- Begin a Pilot Program with some key clients.
- Refine the Toolkit and create Prototypes and Simulation models in order to increase levels of permissioning. (potential new business models).
- Implement both internally and externally.

FIG. 40

Why the IPO Toolkit is unique?

- IPO's proprietary Core Services layer (CSL) enables the Bank to create an event-driven environment within which to refine and create new Toolkit modules seamlessly both internally and externally.

- The Bank is able to react to changes in the market place within a completely "open" technology environment which can be connected to virtually any of it's in-house systems. This provides the modules in the Toolkit with access to all information around the client, both in terms of content, but more importantly context.

- Each Toolkit module plays a different role in the eCM Relationship Management Process and is designed to facilitate the increase in the level of permissioning with the client on a continual basis.

FIG. 41

Implementing eCM : What does it take?

FIG. 43

Sample IPO Toolkit Modules
(Permissioning Suite)

- Research Module
- Knowledge Base Module
- Coverage Module
- Project Module
- Deal Module
- WIP Module
- Activity Module
- Bank Review Module
- Communication Module

FIG 46

METHOD AND SYSTEM FOR INTERFACING CLIENTS WITH RELATIONSHIP MANAGEMENT (RM) ACCOUNTS AND FOR PERMISSIONING MARKETING

REFERENCE TO RELATED APPLICATION

This application is a divisional of Ser. No. 09/833,065 filed Apr. 12, 2001, now abandoned.

BACKGROUND OF THE INVENTION

1. Field of the Invention

The invention relates generally to client relationship management (RM) accounts and, more particularly, to interfacing clients with RM accounts and for permissioning marketing.

2. Description of Related Art

Customer relationship management (CRM) is a term often applied to processes implemented by a company to handle its contact with its customers. CRM software may be used to support these processes, storing information on current and prospective customers. Information in the system can be accessed and entered by employees in different departments, such as sales, marketing, customer service, training, professional development, performance management, human resource development, and compensation. Details on any customer contacts can also be stored in the system. The rationale behind this approach is to improve services provided directly to customers and to use the information in the system for targeted marketing and sales purposes.

Permissioning is a term used in marketing an related contexts. Marketers will ask permission before advancing to the next step in the purchasing process. For example, they ask permission to send advertisements to prospective customers. It is used by some Internet marketers, email marketers, and telephone marketers. It requires that people first "opt-in", rather than allowing people to "opt-out" only after the advertisements have been sent.

There is a need for a CRM environment for product and relationship management to jointly conduct client analysis, planning and delivery in a coordinated and measurable fashion.

BRIEF SUMMARY OF THE INVENTION

In one embodiment the claimed subject matter includes a method of exchanging information between a client and at least one of several service providers. Multiple client objectives are defined. Multiple permissioning rules associated with each of the multiple service providers are defined. The permissioning rules enable two-way access of CRM functionality between the client and at least one of the multiple service providers. Information exchanged between the client and at least one of the multiple service providers is organized in accordance with the permissioning rules. Information exchanged between the client and at least one of the multiple service providers is displayed in accordance with the permissioning rules. Information exchanged between the client and the service provider is thereby organized in accordance with permissioning rules.

In one embodiment defining multiple permissioning rules may include defining rules in accordance with at least one product associated with the service provider. Defining multiple permissioning rules may include defining rules in accordance with at least one person associated with the service provider. Defining multiple permissioning rules may include defining rules in accordance with at least one project associated with the service provider. Defining multiple permissioning rules may includes defining rules in accordance with at least one service associated with the service provider.

In another embodiment, the claimed subject matter includes a method of exchanging information between a client and at least one of several CRM systems. The at least one CRM system is associated with a service provider CRM system. Multiple client objectives are defined. Multiple permissioning rules associated with the service provider are defined via a client portal. The permissioning rules enable two-way access of CRM functionality between the client and at least one of the multiple service providers. Information exchanged between the client and the service provider is organized in accordance with the permissioning rules. Via a client portal the information exchanged between the client and the service provider is displayed in accordance with the permissioning rules. Information exchanged between the client and the service provider is thereby organized in accordance with permissioning rules.

In another embodiment defining multiple permissioning rules may include introducing into a client portal a field associated with a service provider CRM system. Displaying the information exchanged between the client and the service provider in accordance with the permissioning rules may include limiting the displayed information to information which the client wishes the service provider to observe.

BRIEF DESCRIPTION OF THE DRAWINGS

FIG. 6 illustrates an example of a wallet that represents one way in which rolled-up wallet data can be displayed.

FIGS. 19-46 are slides from a PowerPoint presentation further illustrating features of the invention, in which FIG. 19 is a slide entitled Introduction.
FIG. 20 is a slide entitled Introduction.
FIG. 21 is a slide entitled Level of Internet Penetration.
FIG. 22 is a slide entitled The Traditional Look.
FIG. 23 is a slide entitled Today there is dis-intermediation.
FIG. 24 is a slide entitled The Institutional Banking Value Chain.
FIG. 25 is a slide entitled Disruption: The New Reality.
FIG. 26 is a slide entitled The ability of Investment Banks to succeed.
FIG. 27 is a slide entitled Permissioning.
FIG. 28 is a slide entitled eClient Management.
FIG. 29 is a slide entitled eCM and Traditional Relationship Management.
FIG. 30 is a slide entitled Share-of-Mind Permissioning.
FIG. 31 is a slide entitled Share-of-Mind Permissioning (SMP).
FIG. 32 is a slide entitled Going up the Permissioning Ladder online.
FIG. 33 is a slide entitled Stages of eCM.
FIG. 34 is a slide entitled Stages in eCM.
FIG. 35 is a slide entitled eCM and Permissioning Correlation.
FIG. 36 is a slide entitled The eCM Toolkit.
FIG. 37 is a slide entitled The eCM ToolKit and the Client.
FIG. 38 is a slide entitled The eCM ToolKit and the Client, cont'd.
FIG. 39 is a slide entitled The eCM Relationship Management Process.
FIG. 40 is a slide entitled Developing an eCM Program.
FIG. 41 is a slide entitled Why the IPO Toolkit is unique?
FIG. 42 is a slide entitled Effective Knowledge Management drives eCM.
FIG. 43 is a slide entitled Implementing eCM: What does it take?
FIG. 44 is a slide entitled The IO Toolkit Modules.
FIG. 45 is a slide entitled The MCMS Core Services Layer.
FIG. 46 is a slide entitled Sample IPO Toolkit Modules.

DETAILED DESCRIPTION OF THE PREFERRED EMBODIMENTS

Table of Contents

I. Client Relationship Management
A. Introduction
(a) Client Service Teams
(b) Overview of the Client Relationship Management Invention
B. System Architecture
1. User Terminals
2. Network
3. Server
(a) Data Interchange
(b) Data Repository
(c) Report Generator
(d) Security Module
4. Data Collection
(a) Wallet Data
(b) Account Plan
(c) Client Related Activity Data
5. Rolling Up Data
6. Performance Measurement
7. Client Service Team Display
C. Method for Aligning Clients, Products, and Geographies
II. Interfacing Clients with Relationship Management Accounts
A. Client Manager Portals
B. Client Portals
III. Increasing Levels of Permissioning
A. Example Permissioning System
1. Integrated Permissioning System and Client Manager Portal
2. Integrated Permissioning System and Client Portal
IV. Conclusions I. Client Relationship Management The present invention can be practiced with any type of client management method and/or system, including, without limitation, client relationship management (RM) methods and/or systems. In an embodiment, the present invention is implemented in conjunction with a wallet-based client relationship management method and/or system, such as that previously described in co-pending U.S. patent application Ser. No. 09/282,178, filed Mar. 31, 1999, and incorporated herein by reference in its entirety. Portions of the '178 application are repeated below.

A. Introduction

Briefly stated, the previously described client relationship management (CRM) invention provides an environment for product and relationship management to jointly conduct client analysis, planning and delivery in a coordinated and measurable fashion. The CRM invention includes user terminals for use by relationship managers and product managers, where each of the user terminals includes means for entering and displaying wallet data, means for entering, displaying, and signing-up to account objectives, and means for entering and displaying client activity data. A network communicatively couples the user terminals, which is in turn coupled to a server. The server includes a data repository for storing the wallet data, account objectives, and client activity data, and a data interchange for translating and transferring data between the data repository and the network.

Figure 1:
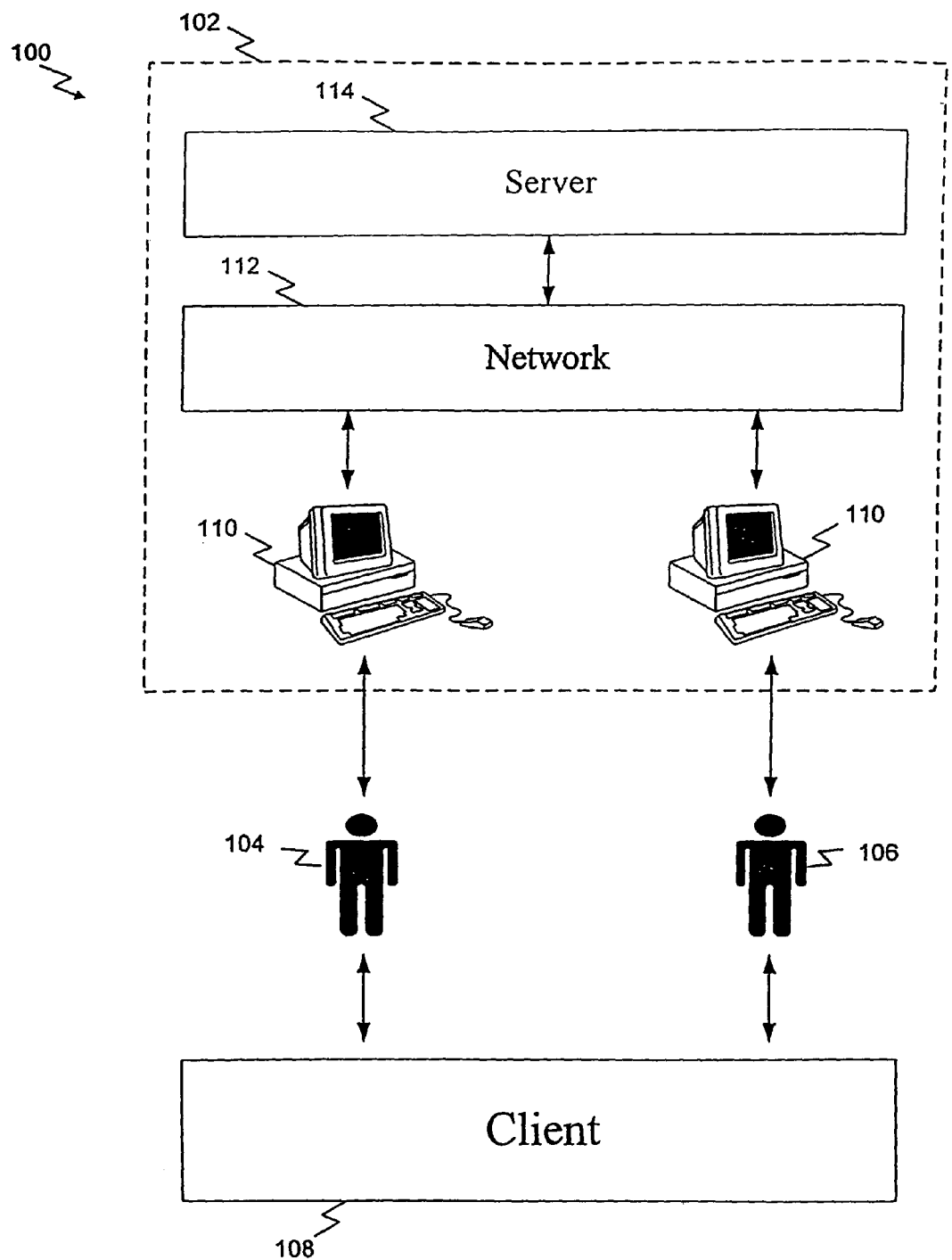
FIG. 1 illustrates an example of an enterprise management environment within which the CRM invention may be used.

FIG. 1 depicts a enterprise management environment 100 within which the CRM invention is used. A relationship manager 104 and a product manager 106, both of whom interact with one or more clients 108, utilize a client relationship management (CRM) system 102. CRM system 102 provides for the integration and alignment of clients, products and geographies. CRM system 102 achieves these results by collecting, analyzing, and disseminating, in a bottom-up and top-down-fashion, wallet data, account objectives, and client related activities related to geographically dispersed clients.

(a) Client Service Teams

Though FIG. 1 depicts a single relationship manager 104 and product manager 106, in most instances CRM system 102 is used by many relationship managers 104 and product managers 106 working for a single entity (e.g., corporation, partnership, and various limited liability business forms), or multiple entities that share some business relationship. The term enterprise will be used herein to refer to the entity, or multiple entities in a business relationship, that relationship managers 104 and product managers 106 represent when dealing with clients 108. Client 108 represents the collective clientele of relationship managers 104 and product managers 106.

Figure 2:
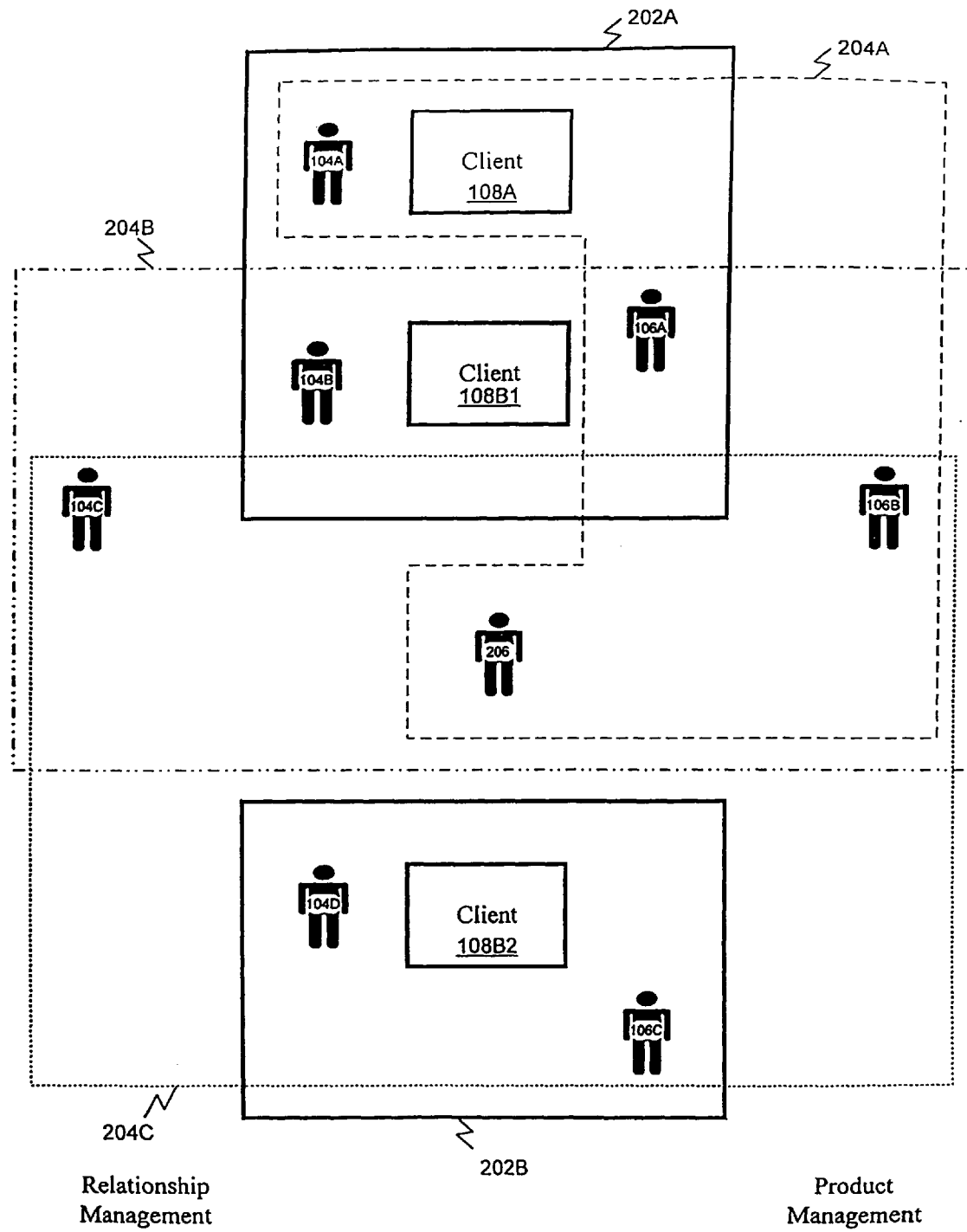
FIG. 2 illustrates an example of how relationship managers and product managers can be organized around clients.

FIG. 2 depicts one example of how relationship managers 104 and product managers 106 can be organized around clients 108. FIG. 2 depicts two geographic locales, a locale 202A and a locale 202B. Two clients are located within locale 202A, a client 108A and a client 108B1. A client 108B2 is located in locale 202B. In this example, client 108B1 and client 108B2 are subsidiaries of the same parent entity. The term subsidiary is used broadly herein to include entities that are affiliated in any way, including, but not limited to, a parent/subsidiary corporate relationship, a business affiliation through contract, and other strategic partnerships between separate entities.

Relationship managers 104 are typically associated with a single client with the responsibility of managing the relationship with that client. Local relationship managers 104 attend to the needs of the client at a particular locale 202. Global relationship managers 104 attend to the entity-wide needs of a client that is dispersed geographically within a single country, or across international borders.

Product managers 106 are typically associated with the sales and/or support of a single product, or a family of related products, to multiple clients 108. Product managers 106 are specialists with respect to the products over which they have responsibility, and are often brought in by relationship managers 104 to service a client for which the relationship manager is responsible. Local product managers 106 service clients 108 within a particular locale 202. Global product managers 106 manage the sales and/or support of their products to clients that are dispersed geographically within a single country, or across international borders.

Associated with each client is a client service team 204, which includes relationship managers 104, product managers 106, and management 206. As depicted in FIG. 2, client service team 204A is associated with client 108A, and includes local relationship manager 104A, local product manager 106A, global product manager 106B, and management 206. Local relationship manager 104A attends to the needs of client 108A within locale 202A. Local product manager 106A services both clients 108A and 108B1 within locale 202A for their needs with respect to the product or products for which local product manager 106A has responsibility. Global product manager 106B manages local product managers 106A and 106C.

Management 206, depicted in the center of FIG. 2, is part of every client service team 204 and represents all levels of management within an enterprise. Management 206 can include branch managers, country managers, heads of relationship management or product management, and senior management at the enterprise headquarters. Though not depicted in FIG. 1, management 206 also preferably has access to user terminals 110.

Client service team 204B is associated with client 108B1, and includes local relationship manager 104B, local product manager 106A, global relationship manager 104C, global product manager 106B, and management 206. Local relationship manager 104B, local product manager 106A, and global product manager 106B all have responsibilities to client 108B1 as described above with respect to client service team 204A. Here, however, global relationship manager 104C is included within service team 204B, and is responsible for managing the entity-wide relationship with geographically dispersed client 108B (with two subsidiaries shown in FIG. 2 as 108B1 and 108B2). Similarly, client service team 204C is associated with the second subsidiary of client 108B (108B2), and includes local relationship manager 104D, local product manager 106C, global relationship manager 104C, global product manager 106B, and management 206.

Those skilled in the relevant art will recognize that FIG. 2 depicts one simple example of how client service teams 204 might be organized. In practice, clients can have offices in many locations with a particular country, and many more offices in countries throughout the world. Locale 202A can therefore represent, for example, a particular neighborhood, city, state, country, or group of countries, depending upon a particular client's business model and to what extent they require interaction from relationship managers 104 and product managers 106. A typical multinational corporation can have offices in thousands of locales 202A across hundreds of countries. Also, complex enterprises typically will have more than two layers of managers (local and global), and will have a cadre of senior management overseeing the entire operation, as represented by management 206.

Furthermore, each relationship manager 104 and product manager 106 depicted in FIG. 2 can represent one or more persons performing the described job. For example, local relationship manager 104A can represent a single individual, or a team of multiple individuals, all responsible for attending to the needs of client 108A within locale 202A. Similarly, product manager 106A can represent an individual, or a team of multiple individuals, all responsible for servicing clients 108A and 108B1 within locale 202A for their needs with respect to the product or products for which local product manager 106A has responsibility. As described above, management 206 represents not only multiple individuals, but often multiple levels of responsibility.

(b) Overview of the Client Relationship Management Invention

Returning now to FIG. 1, CRM system 102 includes user terminals 110 interconnected by a network 112 coupled to a server 114. Relationship managers 104 and product managers 106 interact with CRM system 102 via user terminals 110. In a preferred embodiment, each relationship manager 104 and product manager 106 has access to a user terminal and is trained in its use. Network 112 provides a communication path between user terminals 110 and server 114. As discussed with respect to FIG. 2, oftentimes clients 108 are geographically dispersed over many countries. User terminals 110 must therefore be widely dispersed as well, increasing the cost and sophistication of network 112. Server 114 stores data collected within CRM system 102, performs various data processing tasks, and disseminates data amongst user terminals 110.

Central to CRM system 102 is the collection, analysis, and dissemination of data, in a bottom-up and top-down fashion, including, but not limited to, wallet data, account objectives, client-related activity. The term data, as used herein, refers to discrete items of information that can be entered into a computer in any form, including, but not limited to, textual, pictorial, graphical, and numerical data. Example data includes, but is not limited to, client related data, client service team data (i.e., data describing a particular client service team), deal data, call report data, wallet data and account objectives. Of particular interest within the context of the CRM invention is wallet data, account objectives, and client-related activity. These data types are described in detail below in the appropriate sections.

CRM system 102 provides for the collection of data for each client 108, across the various locales 202 within which client 108 maintains a presence. Data can be collected from various sources, including, but not limited to, data entered by relationship managers 104 and product managers 106 via user terminals 110. In a preferred embodiment, each relationship manager 104 and product manager 106 has accesses to a user terminal for entering data. Data can also be collected from legacy databases or third party information providers, such as electronic news gatherers.

Server 114 stores and processes the collected data. The processing functions of server 114 are many and varied, as will be described in detail below. One primary function of server 114 is to collect data entered by relationship managers 104 and product managers 106 at user terminal 110. The collected data from all levels of the client service team can then be processed to reflect in a composite fashion various reports across, for example, individual managers, entire client service teams, various locales, or across entire clients 108 or specific products.

Data, in either raw or processed form, is disseminated to user terminals 110 via network 112. As described in detail below, a variety of reports are preferably available to relationship managers 104 and product managers 106 via user terminals 110. However, in a preferred embodiment, a security scheme is used to ensure that access is limited to data based on user identity.

B. System Architecture

This section describes in detail the system architecture of CRM system 102. As shown in FIG. 1, CRM system 102 includes user terminals 110, network 112, and server 114. Briefly, user terminals 110 are personal computers with a graphical user interface (GUI) that provide the front-end and day-to-day data capture tool. The GUI includes a simple and user-friendly suite of screens that can be readily comprehended by relationship and product managers. Server 114 provides a relational back-end data warehouse, where structured analysis and reporting can be carried out. Server 114 also provides a cross-referencing mechanism and a message-based interfacing architecture that can be used to link into legacy product or client databases, or into third party information provider databases. Network 112 couples user terminals 110 to each other and to server 114. The following sections address each of these components in detail.

1. User Terminals

User terminals 110 are implemented as a combination of computer hardware and software. Personal computers are preferably used as a hardware platform for user terminals 110. Alternatively, user terminals 110 could be implemented with more sophisticated platforms such as a workstation, or with less sophisticated platforms such as a personal digital assistant (PDA) or a "dumb" terminal capable of data entry and output, but little or no processing. Those skilled in the art will recognize that the choice of hardware in many instances will be driven by the choice of software and the specific implementation of network 112.

The functions performed by user terminals 110 are described in detail below in terms of data inputs and outputs. User terminals 110 interact with the user via a graphical user interface (GUI) well known to those skilled in the art. The GUI presents the user with a variety of data input and data output screens. Those skilled in the art will recognize that many different GUIs could be implemented to perform the described data inputs and outputs. Furthermore, the software creating and controlling the GUI could be resident on user terminals 110, or on server 114 and created and controlled remotely via network 112.

The GUI is preferably implemented using LOTUS NOTES™ where the various data input and output screens appear as documents within that software package. User terminals 110 are therefore preferably implemented using personal computers with sufficient memory and processing power to create and control the various data input and output screens using LOTUS NOTES. Given the functional descriptions below, it would be clear to one skilled in the art how to implement the functionality using LOTUS NOTES. Skilled artisans will recognize that many other equivalent software packages could be used to implement the user terminal GUI.

Alternatively, the GUI can be implemented using browser software well known to those skilled in the art. This GUI would be appropriate where network 112 represents the Internet, as described below. In this embodiment, the GUI can be made up of a series of web pages for data input and output.

User terminals 110 need not be implemented using either identical computer hardware or identical computer software. However, in a preferred embodiment, the GUI at each user terminal 110 is implemented using common software (i.e., LOTUS NOTES). Having a common software platform simplifies the design of server 114 and network 112, though it is not required. A common software platform also allows for the easy integration of a variety of hardware implementations of user terminal 110, which is often the case with enterprise-wide computer networks. If user terminals 110 use different software platforms, an additional software interface would be required to manage communications between network 112 and user terminals 110. The design of such a software interface is well within the level of ordinary skill in the relevant art. However, where network 112 is the Internet, common software is not required, so long as each user terminal 110 is loaded with appropriate browser software.

2. Network

Network 112 communicatively couples user terminals 110 to each other, and to server 114. Those skilled in the art will recognize that network design is well known within the art, and that many different network configurations are possible. Oftentimes, an existing network is already in place within an enterprise, and CRM system 102 is integrated into the existing architecture.

In a preferred embodiment, LOTUS NOTES network software is used within network 112, whose replication model ensures that data is only distributed via Lotus Notes where it is needed. For global clients, data is replicated globally, i.e., a copy of all data related to a global client is physically resident at each user terminal 110. For local clients, the data is replicated only where the client has branch offices. This provides genuinely enterprise-wide scalability because burdens on the overall system are reduced.

In an alternative embodiment, network 112 is implemented as an intranet with dedicated client/server software to interface with user terminals 110. In yet another alternative embodiment, network 112 is implemented using the Internet to couple user terminals 110. Here, web browser technology can be used to provide a GUI and the necessary data transfer facilities for user terminals 110, as described above. Both of these alternative embodiments has an advantage over the preferred embodiment in that data replication is unnecessary. In these embodiments, server 114 provides content on demand to user terminals 110, obviating the need for local copies of the data.

3. Server

Figure 3:
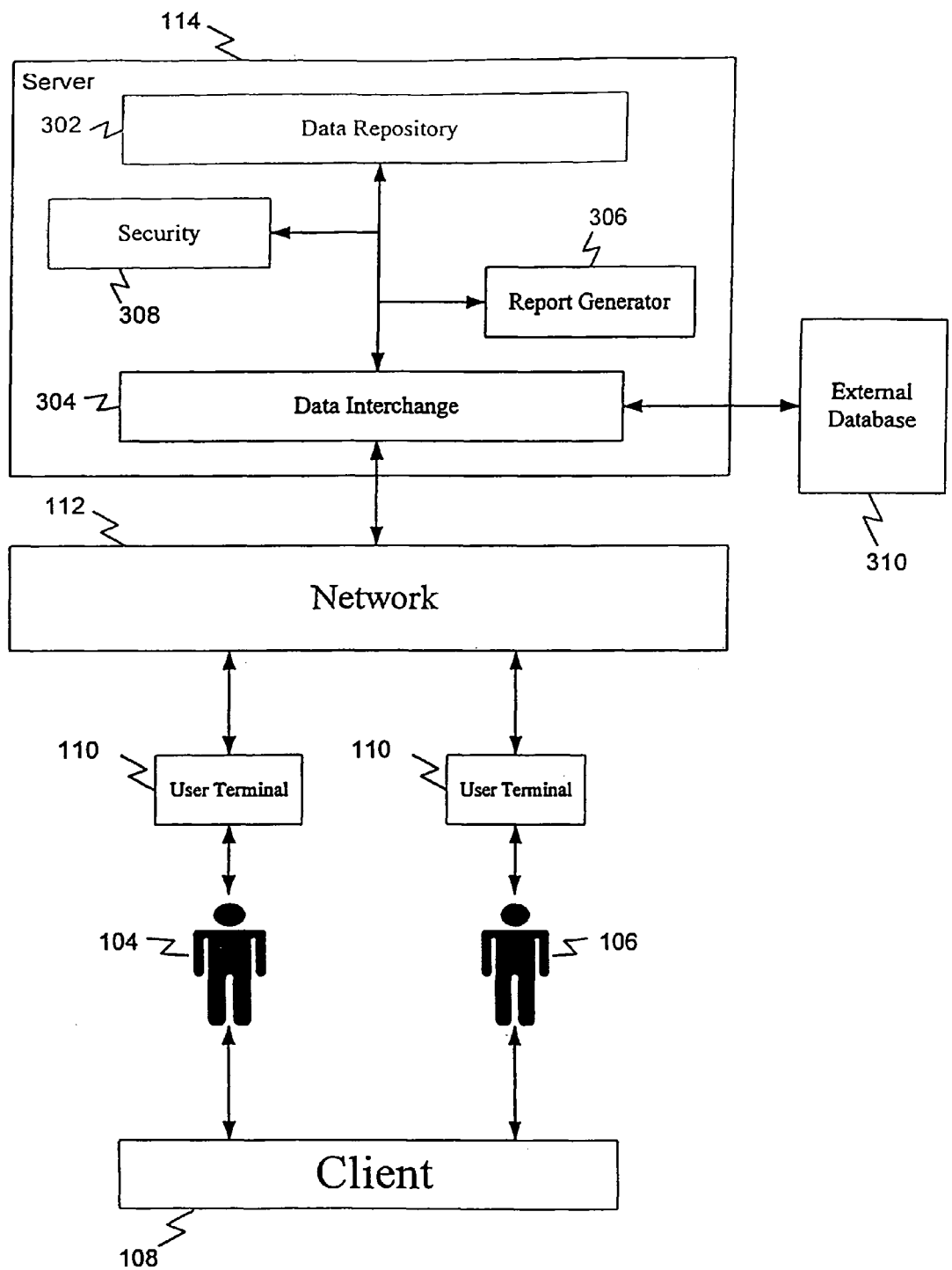
FIG. 3 illustrates an example of a server in greater detail.

FIG. 3 depicts server 114 in greater detail. Server 114 includes a data repository 302, a data interchange 304, a report generator 306, and a security module 308. Data repository 302 is a database containing data used within CRM system 102. Data interchange 304 is responsible for transferring and translating data from one part of CRM system 102 to another. Data interchange 304 converts data into a stream of messages, translates the messages, and then unpacks the messages at the destination. Report generator 306 manipulates the data within data repository 302, as requested by user terminals 110, to create various reports. Security module 308 determines who within CRM system 102 should have access to which information.

Server 114 can be implemented as a variety of different combinations of hardware and software to perform the functions described herein. Those skilled in the art will recognize that the selection of a particular hardware configuration will depend in part on the size and nature of network 114 and user terminals 110. Within the context of the CRM invention, any hardware configuration for server 114 is permissible, so long as server 114 is capable of performing the functions described herein. Those skilled in the art will also recognize that server 114 can represent multiple physical servers that replicate their data to one another. These multiple server embodiments are particularly useful whenever server loading becomes an issue.

FIG. 3 also depicts an external database 310 coupled to data interchange 304. CRM system 102 collects not only from relationship and product managers via user terminals 110, but also from external databases such as legacy systems and third party information providers.

Each of the primary functions performed by server 114 according to a preferred embodiment of the CRM invention is described below in further detail. It will be clear to those skilled in the art that many alternative software implementations are possible that produce the described functionality.

(a) Data Interchange

Data interchange 304 is responsible for transferring and translating data from one part of CRM system 102 to another. Data interchange 304 converts data into a stream of messages, translates the messages, and then unpacks the messages at the destination.

Figure 4:
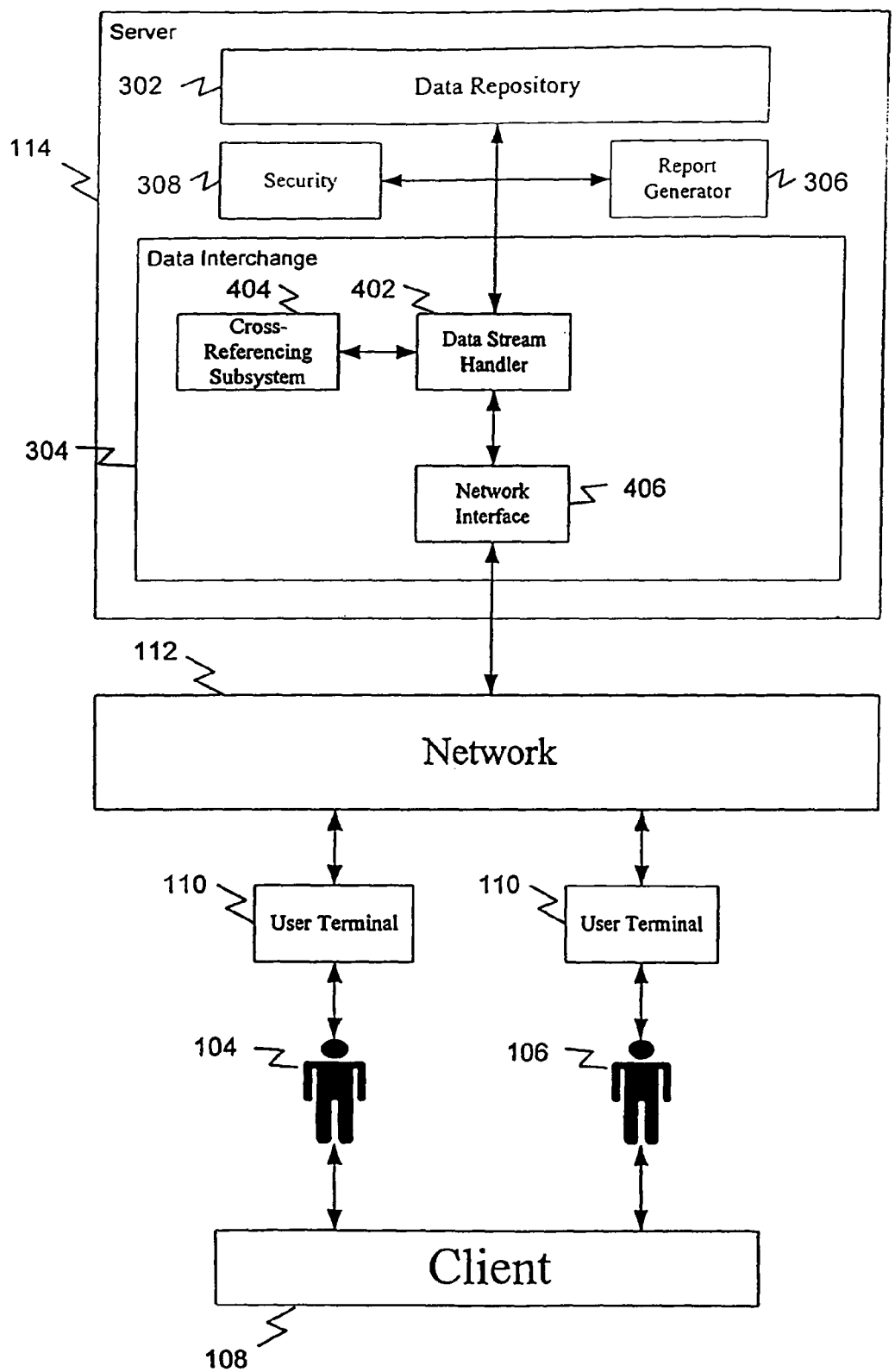
FIG. 4 illustrates an example of a data interchange in further detail.

FIG. 4 depicts data interchange 304 in further detail. In this preferred embodiment, data interchange 304 includes a data stream handler 402, a cross-referencing subsystem 404, and a network interface 406.

Data stream handler 402 transfers and translates information between user terminals 110 and data repository 302. Data stream handler 402 converts data into a stream of messages (which can be partitioned onto a messaging bus), sends the messages via cross-referencing subsystem 404 to be translated, and unpacks the messages at the destination.

Cross-referencing subsystem 404 associates properties of data with a common set of definitions. Cross-referencing subsystem 404 can, for example, cross-reference branches, products, services, people, countries, and cities. Cross-referencing subsystem 402 allocates an identifier to every client of an enterprise, referred to herein as a "global client identifier." In a preferred embodiment, cross-referencing subsystem 404 maintains a mapping between local identifiers used by external databases 310 and the corresponding global client identifiers. Cross-referencing subsystem 404 preferably defines a client at the level of legal entity rather than what each particular external database 310 might consider as a "client."

Network interface 406 provides whatever interface is necessary to communicate with network 112. For example, in a preferred embodiment where network 112 is implemented as a LOTUS NOTES network, network interface 406 includes an interfacing component to detect changes and extract data from the LOTUS NOTES front-end, and a relational system shadow for each data source that is used as a data holding area before being transferred to data repository 302 via data stream handler 402. Those skilled in the art will recognize that several different software data pumps are commonly available from various manufacturers. NOTES PUMP™ is preferably used.

FIG. 3 also depicts external database 310 coupled to data interchange 304. CRM system 102 collects data 502 in at least two different ways. First, relationship managers 104 and product managers 106 enter data via user terminals 110. CRM system 102 also imports data from external databases 310. The data collected from external database 310 passes through data interchange 304, which translates and cross-references the data into a data object 502 suitable for storage within data repository 302.

External database 310 represents an electronic database that contains data that is appropriate for inclusion in data repository 302. External database 310 can be, for example, legacy database maintained by the enterprise that was attached to another management system, a database maintained by a client, or a database maintained by a third party information provider. Legacy systems within large enterprise typically are mutually-incompatible, locally-sited systems that are not configured to effectively communicate with one another. Many types of data would be of interest within CRM system 102, such as client revenue figures, facility information, credit proposals, trade statistics, market capitalization and turnover figures, and cash management volumes.

(b) Data Repository

Figure 5:
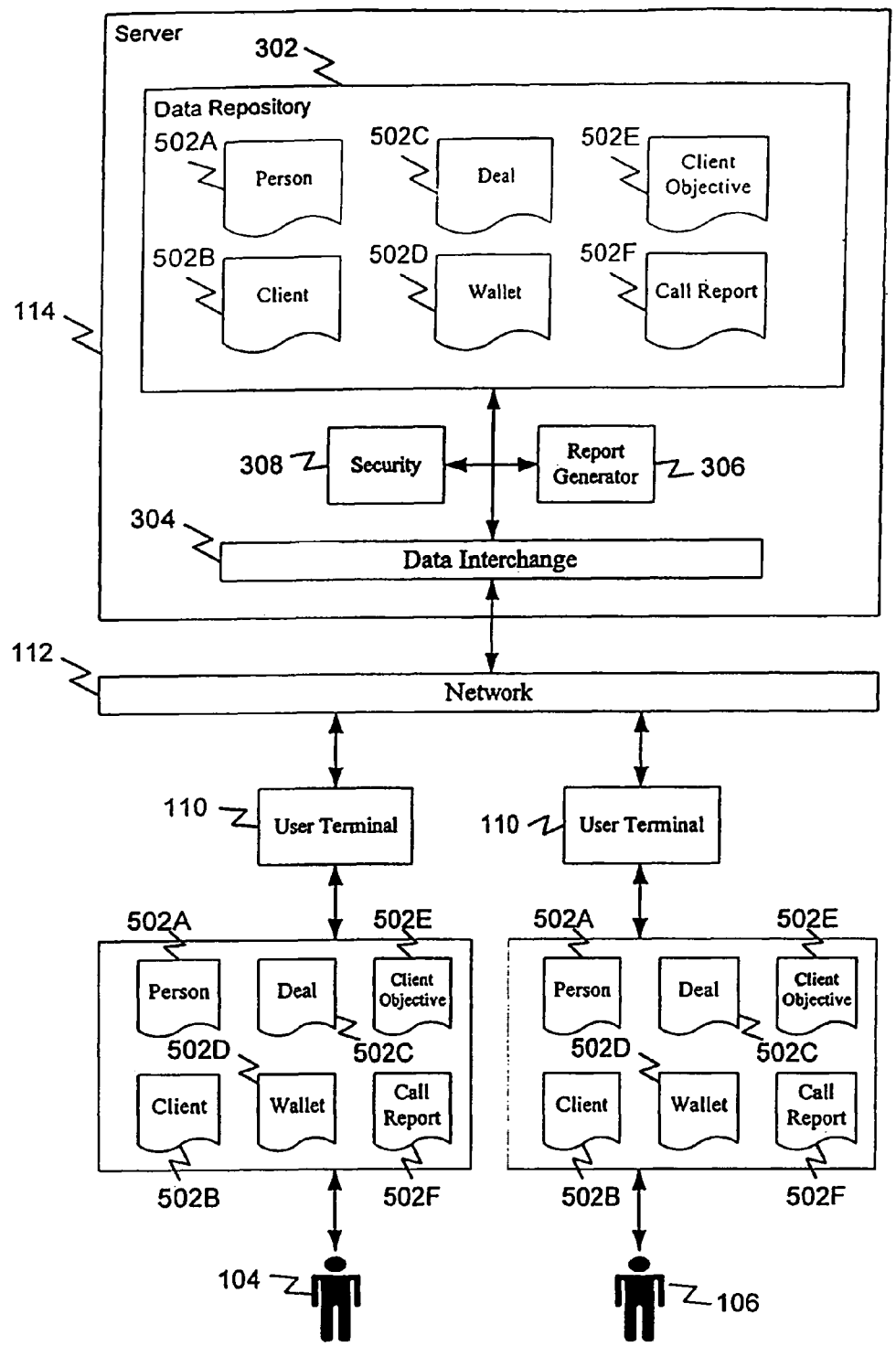
FIG. 5 illustrates an example of a data repository in greater detail.

Data repository 302 represents a normalized, relational database that integrates and organizes data collected from throughout CRM system 102. FIG. 5 depicts data repository 302 in greater detail. Data repository 302 can be implemented using any commercial enterprise database software.

As shown in FIG. 5, data repository 302 stores multiple types of data 502, including, but not limited to, personnel data 502A, client data 502B, deal data 502C, wallet data 502D, client objective data 502E, and call report data 502F. As also shown in FIG. 5, each of these types of data 502 can be entered or displayed via user terminal 110 by relationship and product managers. Thus, manual entry of data 502 at user terminals 110 is one primary channel by which CRM system 102 receives data. Other data channels, such as legacy databases and third party information provider databases, are discussed below.

In a preferred embodiment, the design of data repository 302 is based on the well known Accountability model. Such designs are generic and data driven, and can therefore be adapted to fit different enterprises, or the same enterprise as it evolves through time, without fundamental changes to the schema.

(c) Report Generator

Report generator 306 interacts with data repository 302 to create a variety of reports based on the data stored within report generator 306. Those skilled in the art will recognize that many conventional approaches are available for extracting data from a relational database and creating a report based on that data.

In a preferred embodiment, report generator 306 produces different types of reports. For example, report generator 306 can generate ad-hoc predefined reports that are provided to user terminals 110 upon request. Report generator 306 can also generate scheduled reports which are pre-defined and are delivered to particular users on a regular automated basis. As a final example, report generator 306 can generate custom reports under the direction of a user via user terminal 110.

In an alternative embodiment, report generator 306 delivers reports to users using email rather than (or within, where applicable) the user terminal GUI. In still another alternative embodiment, report generator 306 delivers reports to users using a conventional fax machine. This alternative embodiment would be appropriate where some client service team members do not have access to a user terminal.

(d) Security Module

Security module 308 determines who within CRM system 102 should have access to which information. Security module 308 preferably implements three types of security: customized access lists, role based security, firewalls. Customized access lists can be created for each data object within CRM system 102 that specify which individuals or groups can access the object, and what level of access they are granted (e.g., read, modify, delete). For example, the security requirements of a call report can depend upon the contents of it, which varies on a case-by-case basis. In a preferred embodiment, the author of the data object controls the access list, as they are in the best position to determine who else should be allowed to access it.

Role-based security provides access to data based on position within an enterprise, but independent of the identity of each individual. For example, access to a client's revenue data can be role based: a local relationship manager 104 can see their local clients; regional product managers 106 see their own products within the appropriate region; and management sees clients and products within their sphere of responsibility.

Firewalls refer to partitions that prevent certain individuals from accessing certain data, primarily for ethical or legal reasons. For example, in a banking environment, users from the trading areas of the bank are prevented from seeing data generated within the advisory and commercial areas.

Furthermore, some data can have a combination of one or more of these types of security. For example, a deal will be open to the appropriate client service team, plus certain managers and others, depending upon their roles. This design allows for data owners to determine access to data for every type of user, based on a combination of their job, their level of seniority, the sensitivity of the data, the clients they deal with, the products they work with, and the locale in which they work. This design can account for enterprise hierarchies. For example, some people have high clearance for a complete global client, whereas others may have high clearance only for a particular subsidiary. One person may have responsibility for a region, another just for a particular branch. One person may have high clearance throughout a particular product area, another just a subset of that.

Security module 308 implements security at the database level, ensuring that security is enforced independent of the particular network 112 configuration. CRM system 102 preferable includes other types of security, such as login or authentication security (i.e., making sure the user really is who they say they are). Authentication security can be implemented in a number of ways known within the relevant art, and will vary based on the particular user terminals 110 and network 112. Another example would be transmission security, such as data encryption, which can be implemented within RM system 102 to ensure that intercepted data transmissions cannot be utilized.

Those skilled in the art will also recognize that the functionality described above with respect to security module 308 may require software residing not only within server 114, but can also require software residing within any other component of CRM system 102 such as network 112 or user terminals 112. Software module 308 is depicted within server 114 for purposes of convenience only. For example, where the user interface terminal is implemented using LOTUS NOTES, much of the data access security is implemented within the LOTUS NOTES software.

4. Data Collection

Relationship managers 104 and product managers 106 interacts with CRM system 102 via user terminals 102, including entering and displaying various types of data. Though not depicted as such in FIG. 1, management also in many cases interacts with CRM system 102 via user terminals 102. Wallet data, account plans, and client-related activity are three types of data that are collected, analyzed, and displayed within CRM system 102. Each of these types of data are described in detail in the following sections.

Data can be collected within CRM system 102 in at least two ways. First, data can be entered by relationship managers 104 and product managers 106 using user terminals 110. A GUI is preferably used as the man/machine interface at user terminals 110. However, those skilled in the art will recognize that other man/machine interfaces are possible, including, for example, keyboard-based or voice-based interfaces.

The GUI provides relationship managers 104 and product managers 106 with a simple and intuitive way of entering data. These managers, both local and global, often are the best source of accurate and timely data, as they are the enterprise personnel working most closely with the clients. For example, a particular local relationship manager can enter the appropriate wallet data if a local client informs the manager that the client intends to spend a certain amount on products in the upcoming year. Similarly, a global relationship manager can also enter data if the global headquarters of a client informs the manager that they intend to spend more in a particular global product line.

Data can be imported from external databases 310. This would allow for data from legacy systems internal to an enterprise, client system, or third party system to be folded into data repository 302.

The data collected throughout CRM system 102 is stored in data repository 302. The data within the repository therefore represents data from a wide variety of sources, including enterprise personnel at different responsibility levels and with different types of contacts with clients.

(a) Wallet Data

Collecting wallet data is a key pre-requisite to developing an insightful strategy and/or enhancing sales productivity. Analyzing wallet data allows an enterprise to align their products and services with the spending patterns of its clients through a better understanding of client demand across the spectrum of products and services offered by the enterprise. An enterprise's strategy must reflect what its clients buy and what they spend. The client's wallet therefore both shapes and limits this strategy, allowing an enterprise to focus on the high-potential segments of a market and to allocate the right relationship management and product resources. An enterprise needs to know how much their clients spend, what they want to spend it on, and which providers win the lion's share of their wallet. Over-investing in products or services which constitute a small portion of the client's wallet, or under-investing in products which have a large contribution to the client's wallet is, therefore, ineffective.

The term wallet data, as used herein, refers to the total amount of money a particular client 108 spends on products and services. Wallet data can be expressed in terms of actual or estimated data, and can refer to money spent on a particular product or service, on a range of products or services, or total products and services. In a preferred embodiment, wallet data refers to the aggregate net revenues accruing to the relevant business sector as a result of the purchases of products and services by a particular client 108 in a particular year. Here, relevant business sector refers to those business sectors in which an enterprise sells products or services. Those skilled in the art will recognize that many different formulations of wallet data are possible, and that the appropriateness of any particular formulation will depend upon the particular circumstances in which the formulation is used.

Collecting, analyzing, and distributing wallet data provides many benefits, including, but not limited to, identifying (i) the magnitude as well as the quality (e.g., opportunities for cross-sell, annuity vs. one-off income) of the revenue potential of a particular customer, (ii) an enterprise's relative position vs. the competition, and (iii) products and services that are needed and therefore must be developed/sold more aggressively. Wallet data allows an enterprise to identify individual client needs, plan for each client account in detail, and build client segment and country strategies around the needs of individual clients FIG. 6 depicts a wallet 600 that represents one example way in which rolled-up wallet data can be displayed. Assume for purposes of discussion that wallet 600 depicts wallet data for an example client 108A. Wallet 600 includes one or more rows 602, where each row 602 represents a particular product or service purchased by client 108A. Wallet 600 also includes one or more columns 604, where each column 604 represents the locale in which purchases by client 108A take place. Each entry in wallet 600 can represent data entered by an individual, or a composite of data collected from a variety of sources.

Each column 604 is divided into three sub-columns 606A, 606B, and 606C. Sub-column 606A represents the total wallet, i.e., the total revenue generated over a particular time frame by client 108A's purchases. Sub-column 606B represents the revenue generated by purchases made by client 108A of an enterprise's products or services. Sub-column 606C represents an enterprise's share of wallet. i.e., the percentage of the total wallet attributable to an enterprises's revenues. In other words, sub-column 606C is sub-column 606B divided by sub-column 606A, expressed as a percentage.

In a preferred embodiment, wallets also provide margin data for each product purchased by a particular client within each particular locale. This data provides important information for an enterprise's planning process. Only by knowing the margin, or the extent to which particular products are profitable, can resources be optimally allocated across clients, products, and locales to maximize revenue. Those skilled in the art will recognize that margins can vary by product, by client, and by locale. For example, the margin for a particular product can vary across locales, and even within a particular locale, can vary across clients.

Margin data can be expressed in various formulations across different industries. For example, in the banking industry, capital usage is an indicator of margin for the sale of financial products. For banks, the optimal allocation of capital is the key to profitability.

Providing margin data within wallets allows relationship and product managers to optimally allocate resources, in terms of effort and money, to maximize revenue. This optimal allocation can only be determined if the relative profitability of any given product is known. For example, a client's wallet might indicate that an opportunity exists within a particular locale to greatly increase sales of a particular product. However, if the margin data indicates that sales of this product generate little profit, these resources could be allocated elsewhere to generate greater profitability.

CRM system 102 can generate many different types of wallets that depict different configurations of wallet data. The simplest wallet would be a single entry from wallet 600, i.e., the wallet data for a single product within a single locale.

Other more complex wallets are also possible. For instance, rows 602 can represent, for example, a single product/service, multiple products/services, or a family of products/services. Rows 602 can, for example, represent the purchases of a single client, a subsidiary of a client, subsidiaries within a given locale of a client, all subsidiaries globally of a client, or even multiple clients.

Similarly, other wallets are possible by varying columns 604. For clients that have a single office, or purchase products/services within a single locale, their wallet could be displayed with a single column 604. Furthermore, the granularity of locales provided in columns 604 can vary, e.g., wallet data might, for example, be available on an office-by-office, city-by-city, or country-by-country basis.

Wallet data estimates can be computed using algorithms known to those skilled in the art that combine an individual client's financials and transactions data. These algorithms can vary by product and by industry sector, and are continuously being refined and improved within the art. New algorithms for previously unmodeled products or industry sectors are preferably created in close association with product managers 106 and relationship managers 104 experienced in the relevant industry sector.

For public corporations, most of this information is available electronically through a range of data vendors. For private companies, the source information must come through other channels (oftentimes an enterprise's own interaction with the client) which vary depending upon the type of company. The results are estimates (actuals for some products) of the overall wallet for each client, a breakdown of this wallet by major product, a comparison to industry and size segment average, as well as the enterprise's share of this wallet. In a preferred embodiment, these estimates are validated with the clients themselves. For example, a sample of clients is preferably interviewed at the finance director level to identify any major gaps in the overall wallet estimate and industry behavior.

(b) Account Plan

Creating account plans within an enterprise is key to the successful alignment of clients, products, and geographies in the context of the GRM invention. The term account plan as used herein preferably refers to a client profile, a client wallet, and a set of account objectives. The client profile provides general information related to a particular client 108, including issues and constraints related to doing business with the client, historical information, client business strategies and institutional objectives, and other relatively static information related to the client.

The client wallet was described in the previous section. In the context of the account plan, the client wallet should not only reflect the best estimates or actuals related to a client's spending patterns, it should also reflect a client service team's specific wallet goals. For example, a client wallet should indicate not only that the client service team currently has a ten percent share of wallet for a particular product, it should also indicate that within the context of the overall account plan the client service team intends to increase their wallet share to twenty percent.

The account objectives are an articulated set of goals, expectations, and to do lists, for example, that describe what a client service team 204 intends to accomplish and how it plans to achieve these accomplishments. The account objectives should take into account a client's wallet, and should express target wallet goals. The account objectives preferably identify, for example, those responsible for delivering results, key issues facing the client in the near future, business line strategies and deliverables (product development), and resource requirements to successfully implement a marketing strategy. Defining account objectives that have clear targets for each client service team 204 provides a concrete means for measuring performance. Objectives also serve to solidify in the minds of each member of the client service team what is expected of them individually, and what is expected of the team as a whole.

An account plan can be directed to, for example, a client subsidiary, global client, local product, global product, family of products, local, or group of locales. For example, the client service team dedicated to a particular local client will develop an account plan including a profile of the local client, a wallet for the local client, and a set of account objectives describing what goals the client service team plans to accomplish and how they intend to accomplish these goals. Similarly, the client service team dedicated to a particular global client will develop an account plan including a profile of the global client, a wallet for the global client (including aggregate data of all global client's subsidiaries), and a set of account objectives describing goals and a plan of action. As a further example, the global product managers will develop an global product account plan including a global product wallet, and a set of global product account objectives describing goals and a plan of action related to sales of the global product.

Relationship managers 104 and product managers 106 enter account objectives into CRM system 102 via user terminals 110. CRM system 102 interconnects each relationship manager 104 and product manager 106 within a particular client service team 204, allowing each member of the team to collaboratively form these account objectives, ensuring that both local and global concerns are addressed.

In a preferred embodiment, each member of the client service team indicates their acceptance of the objectives, both personal objectives and team objectives where applicable. This acceptance, referred to herein as "sign-off," is preferably done by an electronic signature via the user terminal GUI, such as a point-and-click operation followed by a password. Those skilled in the art will recognize that other alternative signatures, electronic or otherwise, could be used to indicate sign-off on account objectives. Each relationship manager 104 and product manager 106 signs off on each objective by attaching their electronic signature, and by doing so, they then become accountable for achieving these objectives. Thus, CRM system 102 provides an enterprise with a clear and established procedure for creating accountability within a client service team.

Establishing client service team account objectives also has the effect of aligning relationship managers 104 with product managers 106. In other words, everyone on the team is working towards the same recognized set of objectives. It is then readily apparent where joint agreement has been obtained.

(c) Client Related Activity Data

Client-related activities are tracked using CRM system 102 during the execution of the account objectives. Members of a client service team enter client activity data using user terminals 110. The term "client activity data" is used herein to refer to any information that describes activities engaged in by client service team members that are related to a client. For example, client activity data includes, but is not limited to, transactions, deals, reports, opportunities, marketing activity, calls, appointments, meetings, letters, faxes, email, to do lists, and expense reports.

Relationship managers 104 and product managers 106 enter client activity data via the user terminal GUI. In a preferred embodiment, the functionality associated with commercially available personal information management (PIM) software products is included within the user terminal GUI.

CRM system 102 preferably provides for pipeline management of deals and transactions. Relationship and product managers enter their own deals and transactions via user terminals 110, when can then be reported, for example, by client, product, and country. This provides each client service team member with a leading indicator of revenue. Each deal can be linked to an account objective to which it relates, providing an indication of the degree to which the account plan is being adhered to.

5. Rolling Up Data

Data entered via user terminals 110 is "rolled-up" within CRM system 102. As used herein, rolling-up data refers to the process whereby wallets, account plans, and client-related activity data developed at the local level is passed up through network 112 to relationship and product managers at the global level, and any levels in between when they exist.

Figure 7:
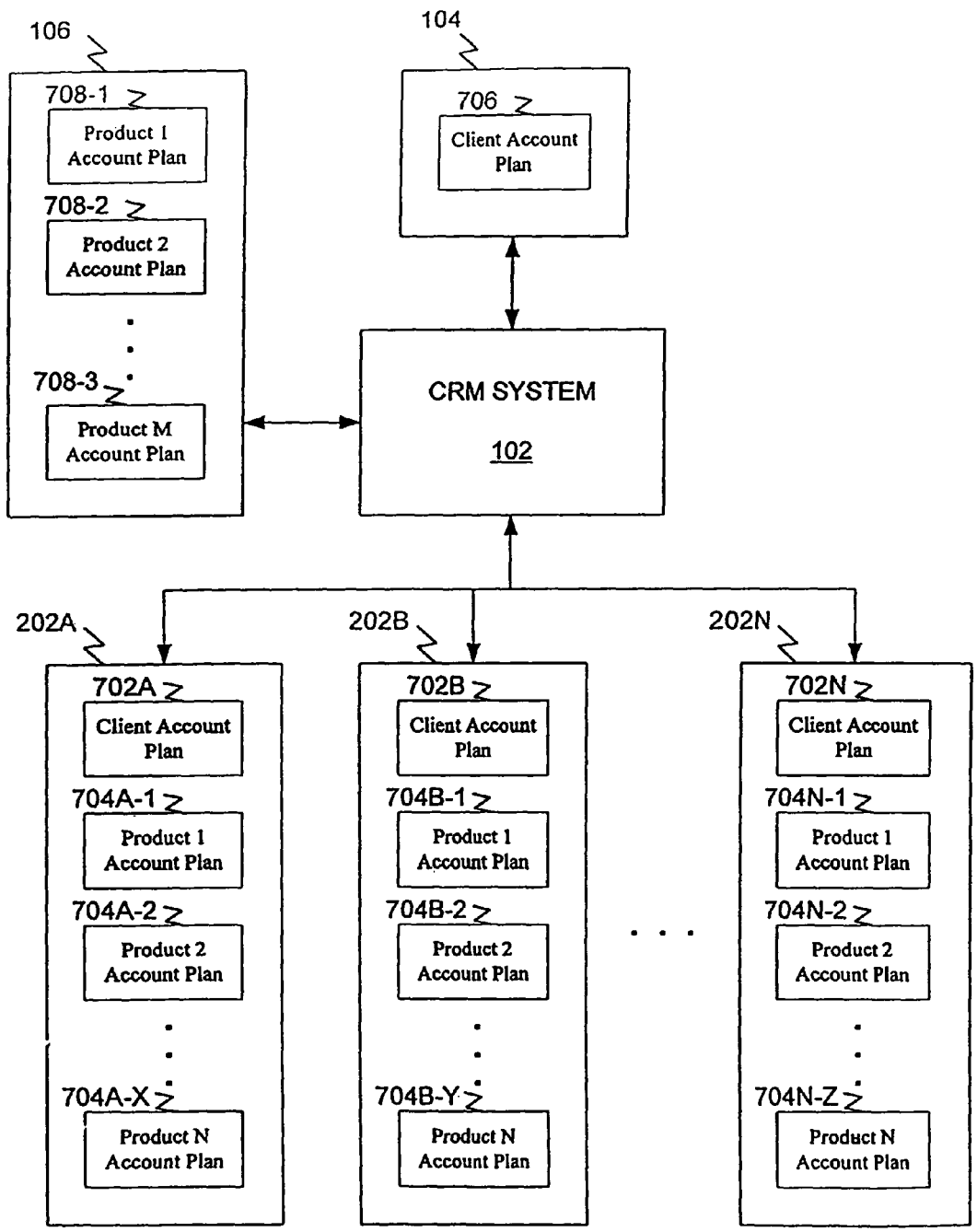
FIG. 7 illustrates an example of distribution of data throughout a CRM system for a representative global client.

FIG. 7 depicts an example distribution of data throughout CRM system 102 for an example global client. The example global client has subsidiaries within locales 202A, 202B, . . . , 202N. The client service team within each locale 202 develops an client account plan 702 and one or more product account plans 704. For example, a client service team within locale 202A develops a client account plan 702A and product account plans 704A-1, 704A-2, . . . , 704A-X, for the client's local subsidiary. Client account plan 702A, as described above, includes a client wallet and account objectives describing the local client service team's goals with respect to the local subsidiary and how the local client service team plans to achieve the goals. Client service teams in locales 202B, . . . , 202N all develop client account plans 702 and product account plans 702 in parallel for their local client subsidiaries.

These local client account plans 702 and product account plans 704 are then rolled-up to the global relationship manager 104 and global product managers 106 with responsibility for the global client. In other words, CRM system 102 collects the account plans 702 and product account plans 704 at locales 202A, . . . , 202N, and presents an aggregate of this data to the global managers. For example, global relationship manager 104 can access via user terminal 110 any of the client account plans 702 or product account plans 704 for any of the client's subsidiaries. Global relationship manager 104 can also generate reports via user terminal 110 showing, for example, wallet data that is a composite of multiple subsidiaries, or multiple products. Similarly, global product managers 106 can generate via user terminal 110 local or global reports on product account plans. The CRM invention is therefore a "bottom-up" system where account plans generated at the local level can be viewed and aggregated at the global level.

These tools aid global managers when they determine global account plans. Global relationship manager 104 determines a global client account plan 706, including a global client profile, global client wallet, and global account objectives. The components of the global client account plan address the buying patterns, goals, and execution plans for the global client as a whole. Similarly, global product managers 106 determine a global product account plan 708 for each global product sold to the global client. For the example client shown in FIG. 7, global product managers 106 determine product account plans 708-1, . . . , 708-M.

Global client account plans 706 and global product account plans 708 are distributed via CRM system 102 to each local client service team. The local client service team can then determine whether their local client and product account plans are in alignment with the global client and global product account plans. The CRM invention is therefore also a "top-down" system where account plans generated at the global level are distributed to local client service teams.

Therefore, overall, CRM system 102 is both a bottom-up and top-down client management system. This bottom-up and top-down flow of client and product account plans creates alignment of the local and global client service team across multiple locales 202 and multiple products.

6. Performance Measurement

CRM system 102 provides a rich set of performance measurement tools via user interface 110 for relationship managers, product managers, and management at each level. These tools provide a clear view of what is taking place, and where there is potential for things to go wrong. Broad aggregates, charts and graphs provide the big picture overview and trends, but it is also important to be able to hone in on individual details.

Report generator 306 can provide data illustrating the following: (i) whether the account objectives are realistic in light of the wallet estimates, (ii) what percentage of the account objectives have been signed-up to by team members, (iii) where the account objectives are aimed, and whether the resources are available to deliver upon these objectives, (iv) how much of a marketing effort is directly aimed at achieving the account objectives, and how much is required just to maintain existing business, (v) whether an account is being over-or-under-managed in light of the wallet potential, (vi) whether the respective product areas actually conducting calls and deals in view of the objectives they have signed-up to, (vii) how the various locales and products compare, (viii) at what stage in the pipeline are most of the pending transactions, and (ix) whether cross-sell is taking place relative to the wallet potential.

CRM system 102 allows an enterprise to measure the degree to which client service teams are being successful, which is critical to maintaining accountability. Report generator 306 can be used to compare, for example, the predicted revenue based on account objectives by product and locale, against the current predicted revenue from the deal pipeline. This allows management early on to identify whether revenue targets are on track. At the end of each reporting period, the degree to which the objectives were met can be measured. The failure points can be identified, and the responsible parties made accountable if applicable.

Tracking wallet data can indicate possibilities for leveraging a strong sales presence in one product/service to achieve sales in other products/services where the enterprise's share of wallet is less strong. This is referred to herein as an opportunity for cross-sell. Maximizing cross-selling means to sell more products, in more locations, to more clients. This is critical to grow revenues ahead of costs. Wallet data also provides an indication of a client's spending patterns in terms of where products/services are being purchased. For example, this data could indicate that a client is spending more money in country A than in country B. This data would allow an enterprise to readjust its marketing efforts if more effort was being expended in country B chasing fewer dollars than in country A.

Tracking client related activity provides members of a client service team with valuable information. For example, a global relationship manager can monitor the level of activity with respect to a particular client. This can be particularly valuable when determining a correlation between client related activity and revenue. If revenues for a particular client are below the account objectives, a global relationship manager can determine, for example, how many calls have been placed to that client, or how many meetings set up. A low level of activity might correlate to low revenues. Alternatively, a review of the client related activity might show that several deals are in the pipeline that will produce the expected revenues. Accountability for meeting account objectives is therefore reinforced 7. Client Service Team Display In a preferred embodiment, the user terminal GUI displays the client service team upon request by the user. The names of the client service team are displayed along with their picture. Displaying each member's picture increases the familiarity between team members, which is particularly important for very large client service teams, or whenever a user seeks information on another unfamiliar team. More importantly, displaying one's picture tends to increase accountability within a service team. Senior managers are able to display performance reports and correlate performance directly with the name and picture of the responsible team member. Including the pictures in the client service team display personalizes an otherwise anonymous interface. More closely associating team members with the responsibility for achieving objectives increases accountability within an enterprise.

The GUI also allows a user to navigate through various levels of local and global client service teams, in order to simplify the display. This is particularly useful for global clients for whom multiple client service teams, at the local and global level, are assigned. For example, an opening display can depict the global client service team with their respective pictures, along with an icon depicting each of the client's local subsidiaries. Selecting a subsidiary icon brings up another display depicting the local client service team and their respective pictures for that subsidiary. In any event, for very large client service teams, whether local or global, only selected key members of the team are displayed in order to simplify the display.

Similarly, user terminals 110 also have the capability of depicting pictures of various personnel within a particular client 108. This display is preferably organized according to the hierarchy of the client, with pictures for each of the key personnel.

C. Method for Aligning Clients, Products, and Geographies

Figure 8:
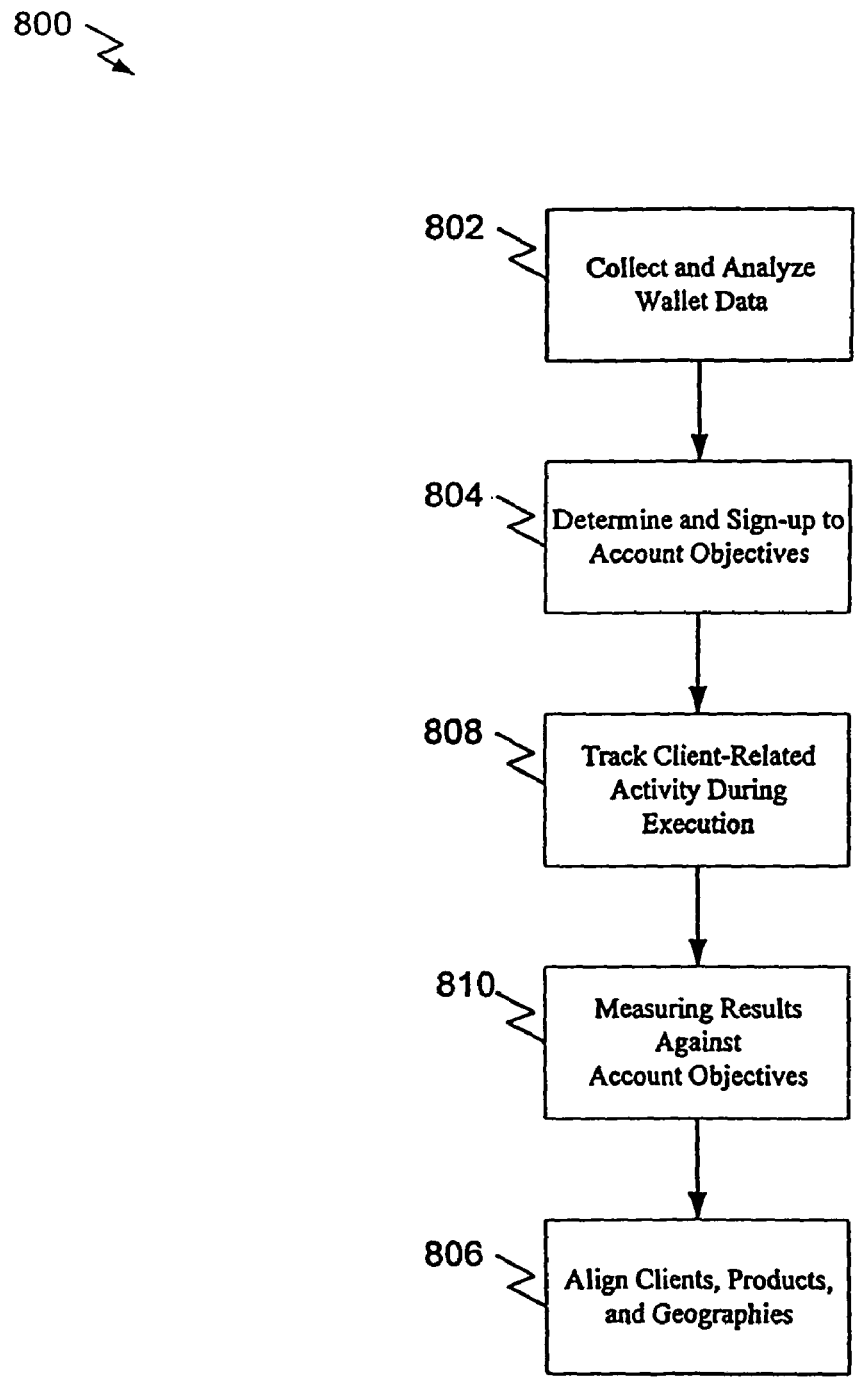
FIG. 8 illustrates an example of a flowchart that describes a method for integrating and aligning client, products and geographies according to the CRM invention.

FIG. 8 depicts a flowchart 800 that describes a method for integrating and aligning client, products and geographies according to the CRM invention. In step 802, wallet data is collected and analyzed. This analysis allows an enterprise to align their products and services with the spending patterns of its clients through a better understanding of client demand across the spectrum of products and services offered by the enterprise. An enterprise's strategy must reflect what its clients buy and what they spend. Relationship managers 104 and product manager 106 enter wallet data into CRM system 102 via user terminals 110.

In step 804, account objectives are determined to which each member of the client service team then signs-up. The term account objectives is used herein to refer to an articulated set of goals, expectations, and to do lists, for example, that describe what a client service team 204 intends to accomplish and how it plans to achieve these accomplishments.

In step 808, client-related activities are tracked using CRM system 102 during the execution of the account objectives. Members of a client service team enter client activity data using user terminals 110. The term client activity data is used herein to refer to any information that describes activities engaged in by client service team members that are related to a client. For example, client activity data includes, but is not limited to, transactions, deals, reports, opportunities, marketing activity, calls, appointments, meetings, letters, faxes, email, to do lists, and expense reports.

In step 810, results are measured against the account objectives established in step 804. CRM system 102 provides management at each level with a clear view of what is taking place, and where there is potential for things to go wrong. Broad aggregates, charts and graphs provide the big picture overview and trends, but it is also important to be able to hone in on individual details.

In step 806, client, products, and geographies (locales) are aligned. The alignment of clients, products, and geographies can best be described as a global sales productivity process. The objective of this process is to result in the optimization of capital.

Figure 9:
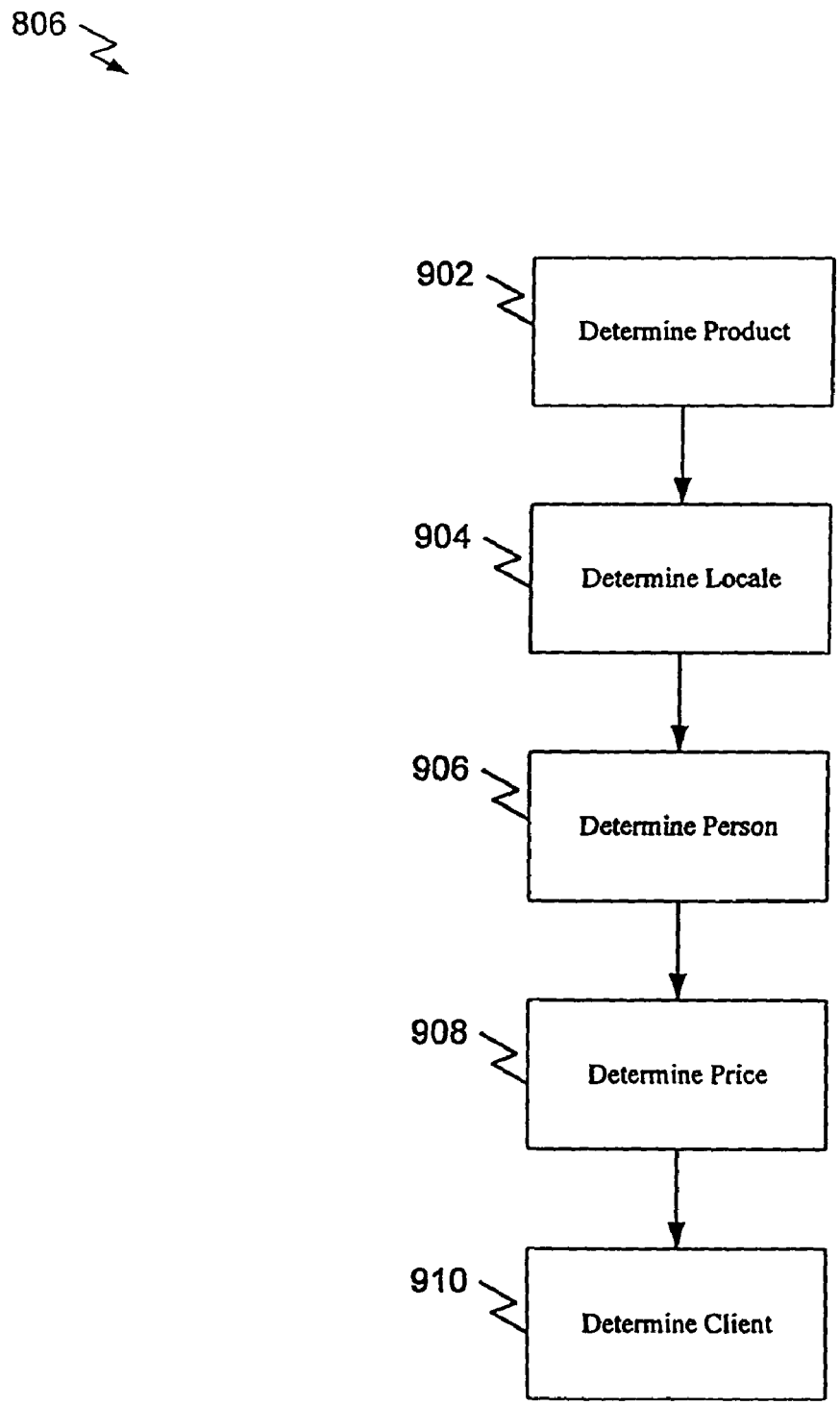
FIG. 9 illustrates an example of 806 in further detail.

FIG. 9 depicts 806 in further detail, though these steps do not necessarily have to occur in any particular order. In step 902, a product is selected to sell to client 108. This determination is made based on which will bring about the greatest revenue and profitability. Tools present in CRM system 102 that are particularly useful are the wallet and the product delivery history (i.e., fulfillment history of critical account objectives in this product area). This will maximize the return on sales effort.

In step 904, a locale is selected. As in step 902, this determination is made based on which will bring about the greatest revenue and profitability. Tools present in CRM system 102 that are particularly useful are the wallet, and the product delivery history and the competitive structure of the wallet.

In step 906, the correct personnel within the enterprise to effectively deliver the product are selected. The product manager objective fulfillment rate and relationship manager objective fulfillment rate can be used along with the sensitivity of the sales process.

In step 908, the price is selected. The correct price is preferably a function of the available wallet, the competition for this wallet, and the historical performance with this client on this product.

In step 910, the client selection is confirmed. The client determination is again based on the available wallet and the prospect of earning sustainable returns.

II. Interfacing Clients with Relationship Management Accounts

A. Client Manager Portals

The present invention is directed to methods and systems for interfacing clients with client account managers and/or client management account databases are now described.

Figure 10:
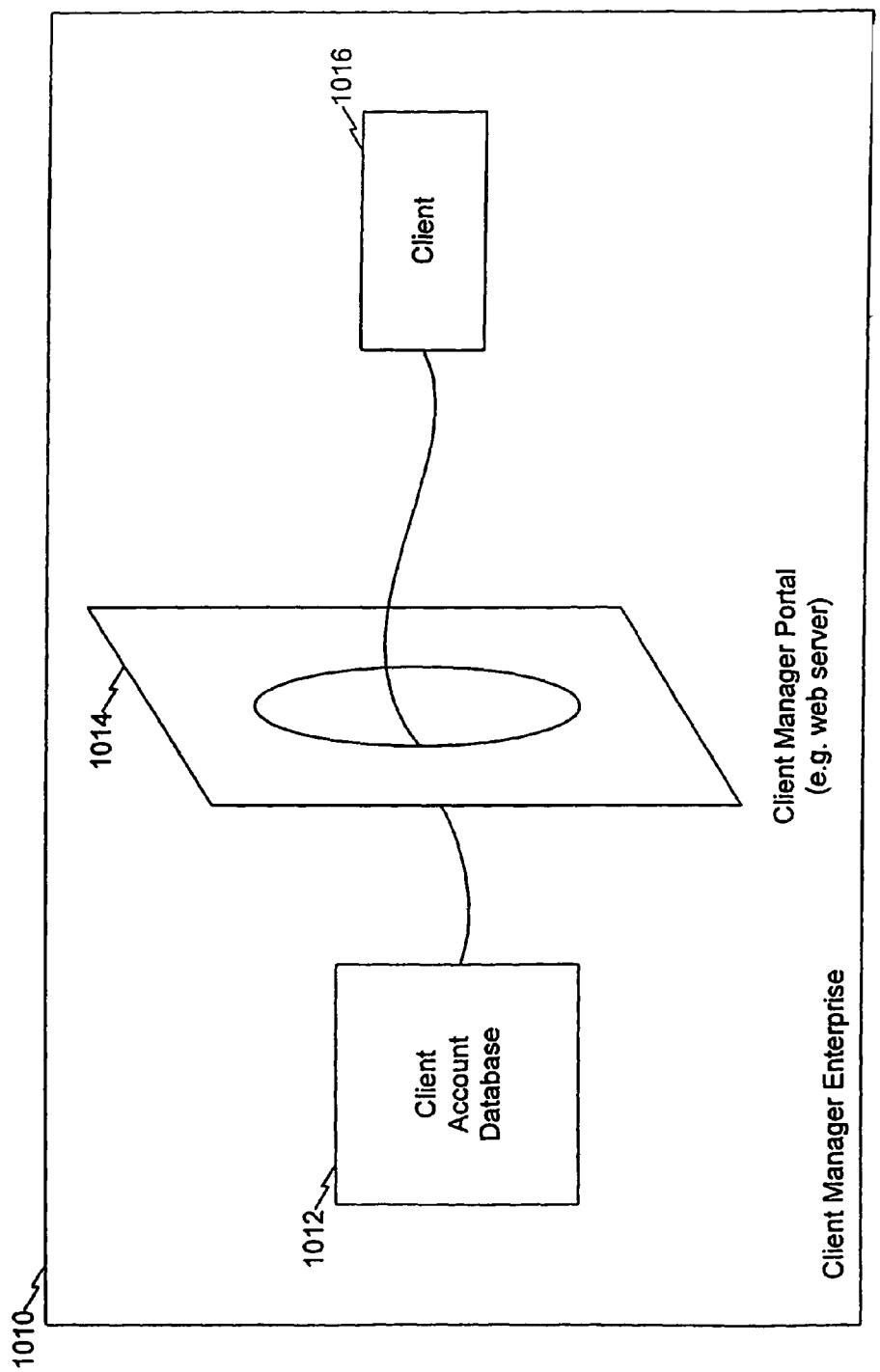
FIG. 10 illustrates an example of a client manager enterprise.

FIG. 10 illustrates an example client manager enterprise 1010, which can be any type of client manager enterprise including, without limitation, a bank, or any other financial services enterprise, or any other type of enterprise which manages clients and any other enterprise which maintains client accounts.

Client manager enterprise 1010 includes a client account database 1012, which can be any type of client management account database including, without limitation, a client relationship manager account database as described above.

Typically, client account database 1012 is protected with one or more devices, such as firewall devices. In accordance with the invention, a client manager portal 1014 is provided to allow a client 1016 to access client account database 1012. Client manager portal 1014 can be any interfacing method or device including, without limitation, an internet server/web site, or any other communications portal. Where client manager portal 1014 is a web server or web site, client 1016 accesses client account database via the internet.

Typically, a security system or device is included at one or both of client manager enterprise 1010 and client 1016 to perform suitable identification and/or handshaking to ensure that only authorized clients 1016 are permitted to access client account database 1012.

Figure 11:
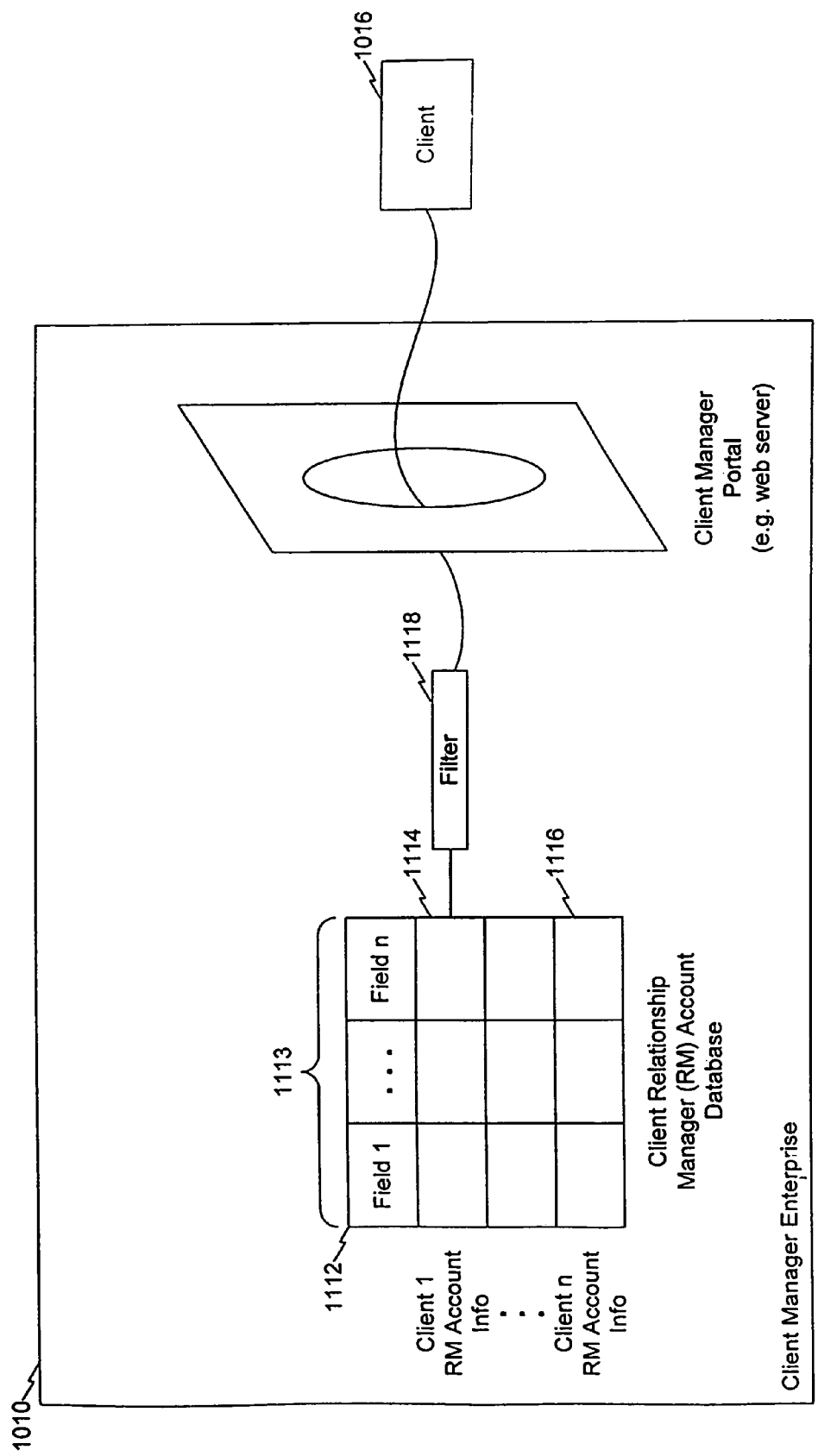
FIG. 11 illustrates an example of an implementation of a client account database as a client relationship manager (RM) account database.

FIG. 11 illustrates an example implementation of client account database 1012 as a client relationship manager (RM) account database 1112. Client RM account database 1112 includes a plurality of client entries 1114 through 1116. Each client entry 1114 through 116 includes a plurality of data entry fields 1113. Other embodiments of client account database 1012 are contemplated and within the scope of the present invention. Based on the description herein, one skilled in the relevant art(s) will understand that other databases can be employed as well.

In FIG. 11, client manager enterprise 1010 includes one or more optional filters 1118. Filter 1118 is intended to restrict the fields of data which are accessed by the client 1016.

Figure 12:
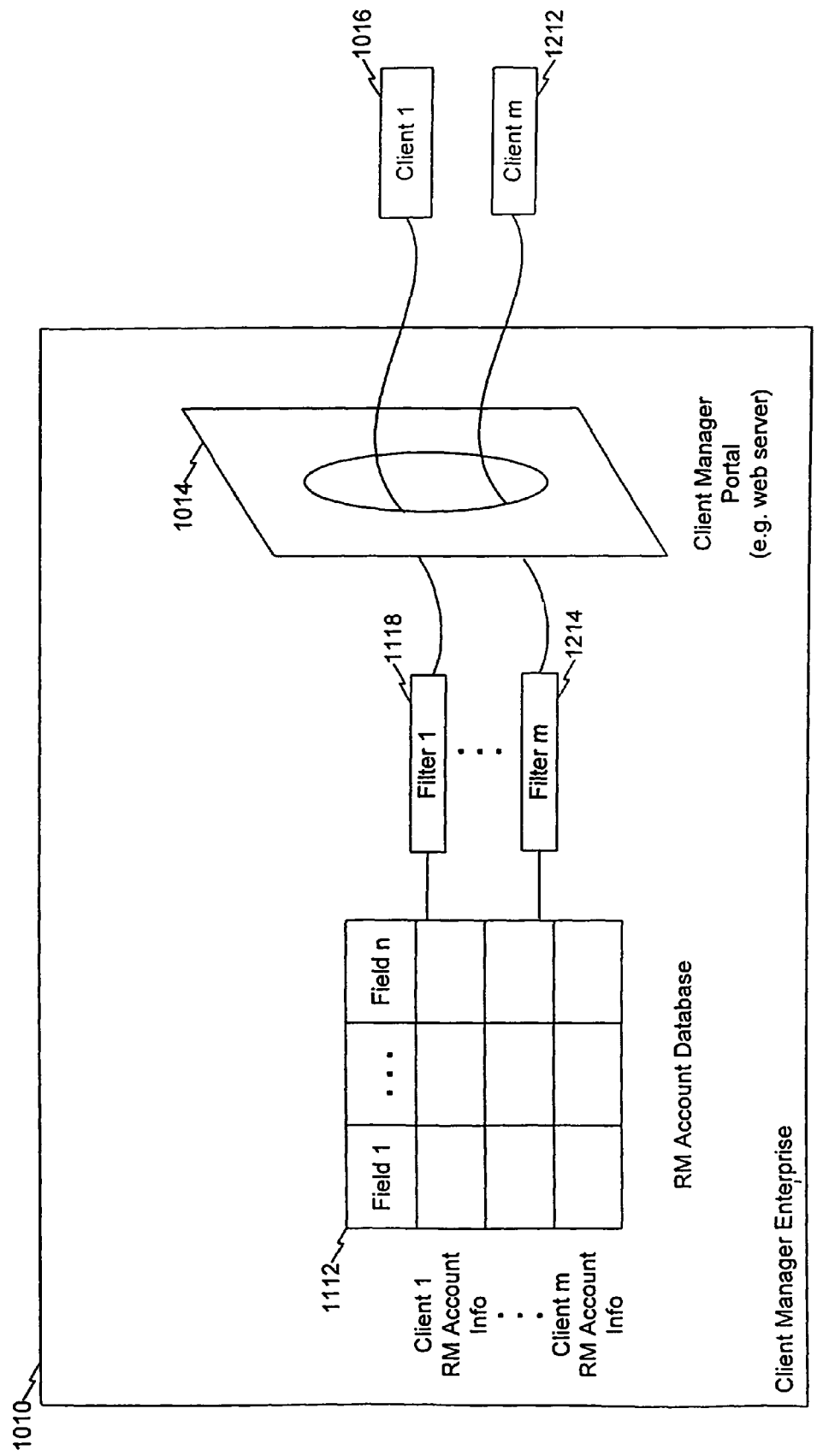
FIG. 12 illustrates an example of a client manager enterprise with a plurality of filters.

In FIG. 12 illustrates client manager enterprise 1010 with a plurality of filters 1118 through 1214. In this embodiment, additional clients 1212 can access their associated client accounts in client RM account database 1112 through the client manager portal 1014.

In the example embodiment illustrated in FIG. 12, a separate filter 1118 through 1214 is provided for each client 1212. This allows the client manager enterprise 1010 to vary the level of access provided to different clients. In an alternative embodiment, a single filter 1118 can be provided for a plurality of clients so that each client has access to the same data fields of their respective accounts.

In many situations a client will have relationships with multiple client manager enterprises. For example, a client may purchase services and/or products, such as banking or financial services and products, from multiple client management enterprises.

Figure 13:
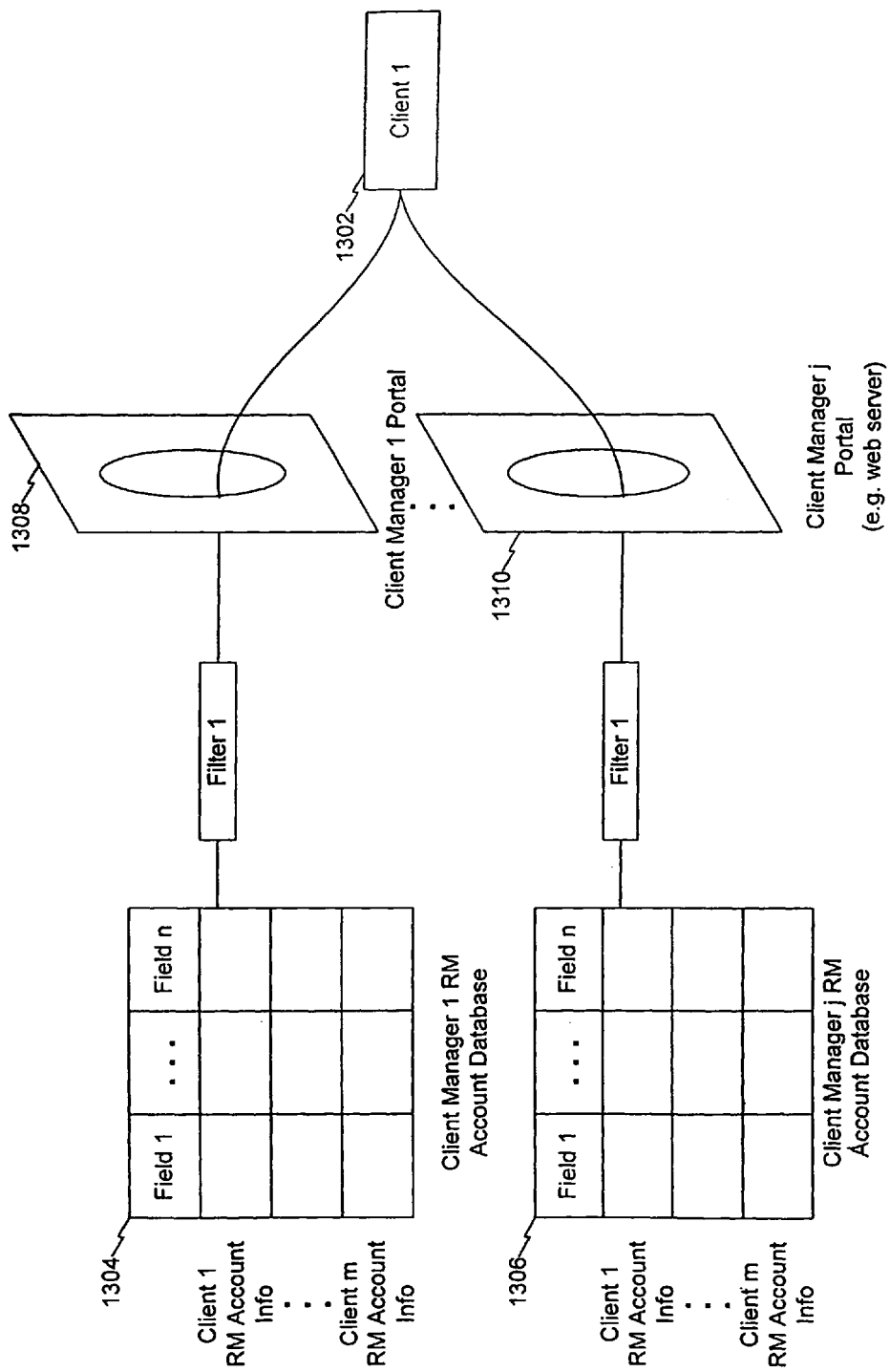
FIG. 13 illustrates an example of an embodiment of the invention where a client 1016 interfaces with multiple client manager enterprises 1304 through 1306 through separate client manager portals 1308 through 1310.

FIG. 13 illustrates an embodiment of the invention where a client 1016 interfaces with multiple client manager enterprises 1304 through 1306 through separate client manager portals 1308 through 1310. Optionally client 1302 is provided with software for storing and/or displaying account information from enterprises 1304 through 1306 on a single display and/or on a series of displays, for easy viewing and/or to enable client 1302 to compare client account data from multiple client manager enterprises.

Additional clients can access their respective accounts in account databases 1304 through 1306 through enterprise portals 1308 through 1310.

B. Client Portals

Figure 14:
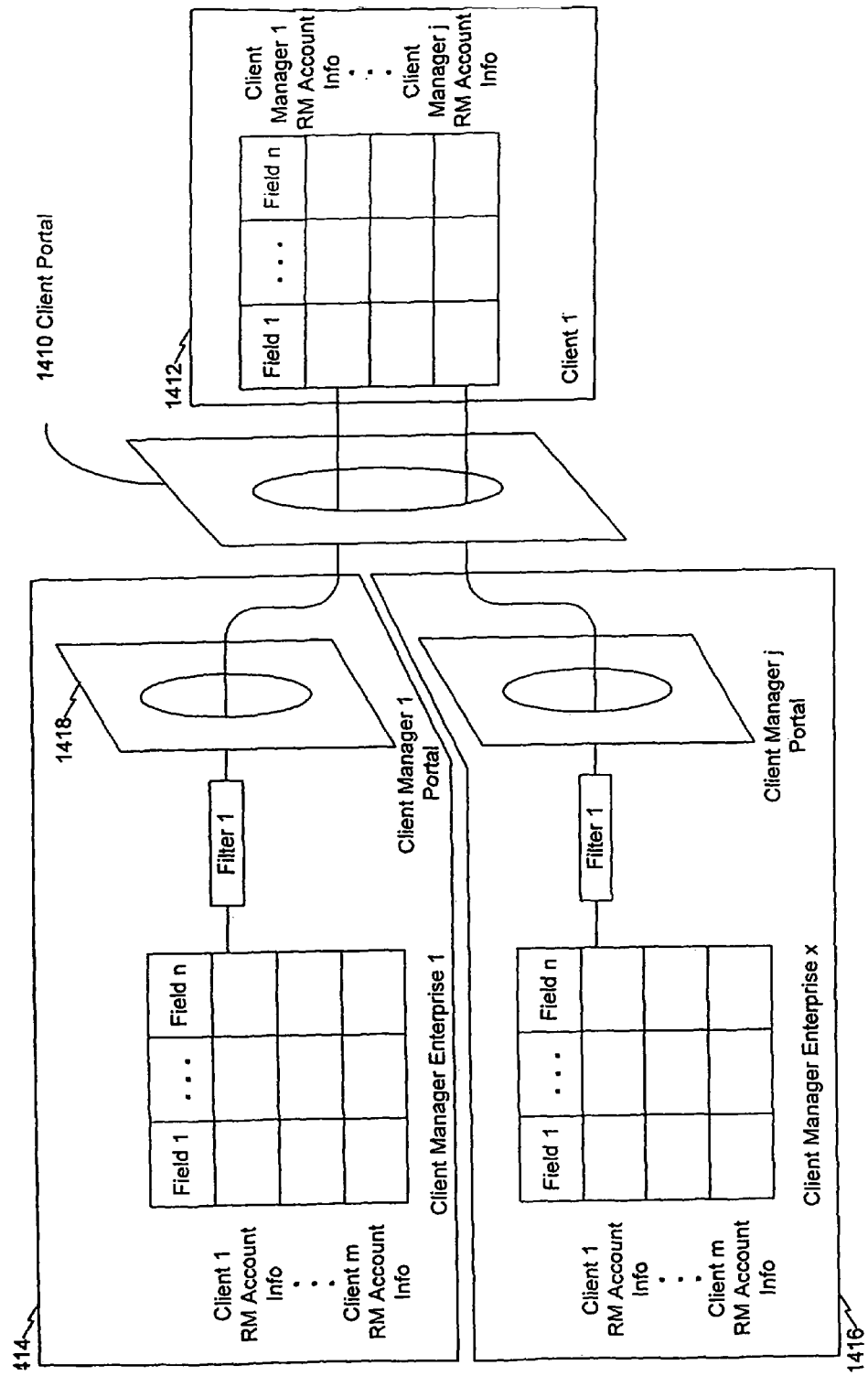
FIG. 14 illustrates an example of an example client portal 1410 that interfaces a client 1412 to multiple client manager enterprises 1414 through 1416.

In an embodiment, a client portal is provided to allow a client to simplify a client's access to multiple client account databases. FIG. 14 illustrates an example client portal 1410 that interfaces a client 1412 to multiple client manager enterprises 1414 through 1416. In an embodiment, client portal 1410 is implemented as a web based server or web site. In an embodiment, client portal 1410 is dedicated to client 1412 and can be maintained by client 1412. In an alternative embodiment, client portal 1410 is maintained separate from client 1412, for example, by a third party internet service provider.

In an embodiment, when client portal 1410 is maintained separate from client 1412, client portal 1410 provides access to client manager enterprises 1414 through 1416 for multiple clients 1412.

An advantage of client portals, such as client portal 1412, is that client 1410 can access multiple client manager databases simultaneously and/or from a single display screen and with what appears to client 1412 to be a single communications interface connection. In an embodiment, client 1412 and/or client portal 1410 includes software that allows client 1410 to display client account data from multiple client manager enterprises.

III. Permission Marketing

In an embodiment, the present invention includes a method and system for permission marketing. In an embodiment, permission marketing offers consumers incentives to accept advertising voluntarily. Permission marketing enables companies to develop long-term relationships with customers, create trust, build brand awareness, and improve chances of making a sale. Permission marketing is described in, for example, Seth Gordon, Permission Marketing, Turning Strangers Into Friends, and Friends Into Customers, (Simon and Schuster, 1999), incorporated by reference herein in its entirety.

A. Method for Permission Marketing

Permission marketing can be implemented with various levels of interaction between a enterprise and a client. At one end of the spectrum, there is minimal interaction between the enterprise and the client. At the other end of the spectrum, there is complete interaction and joint knowledge of one another.

Below are four example implementations of permission marketing, which can be implemented in a process, preferably a computer based processed. Permission marketing, as implemented in accordance with the present invention, is not limited to the examples provided below. One skilled in the relevant art will understand, based on the description herein, that permission marketing can include or omit various features from more than one of the example embodiments provided below.

In a first example embodiment, permission marketing is implemented using a catalog of services approach, where the client manager enterprise posts information on its product offerings, distributes research, and posts contact information. In this embodiment, permissioning marketing is substantially a one way, read only process.

In a second example embodiment, permission marketing is implemented using a client centered approach that is similar to the catalog of services approach described above, but personalized for the client. This example embodiment includes, for example, access to relevant research, summary transaction information etc., prepared for one or more specific clients.

In a third example embodiment, permission marketing is implemented using a client centered approach, including two-way dialog for some lines of businesses (LOBs), but were two or more LOBs act independently of one another.

In a fourth example embodiment, permission marketing is implemented as a full client strategy process, where there is substantial, if not complete, alignment of client coverage, account management and planning, product execution and delivery. In this embodiment, the client manager enterprise and the client have the full view of each others relationship and value propositions.

B. Example Permissioning System

Figure 15:
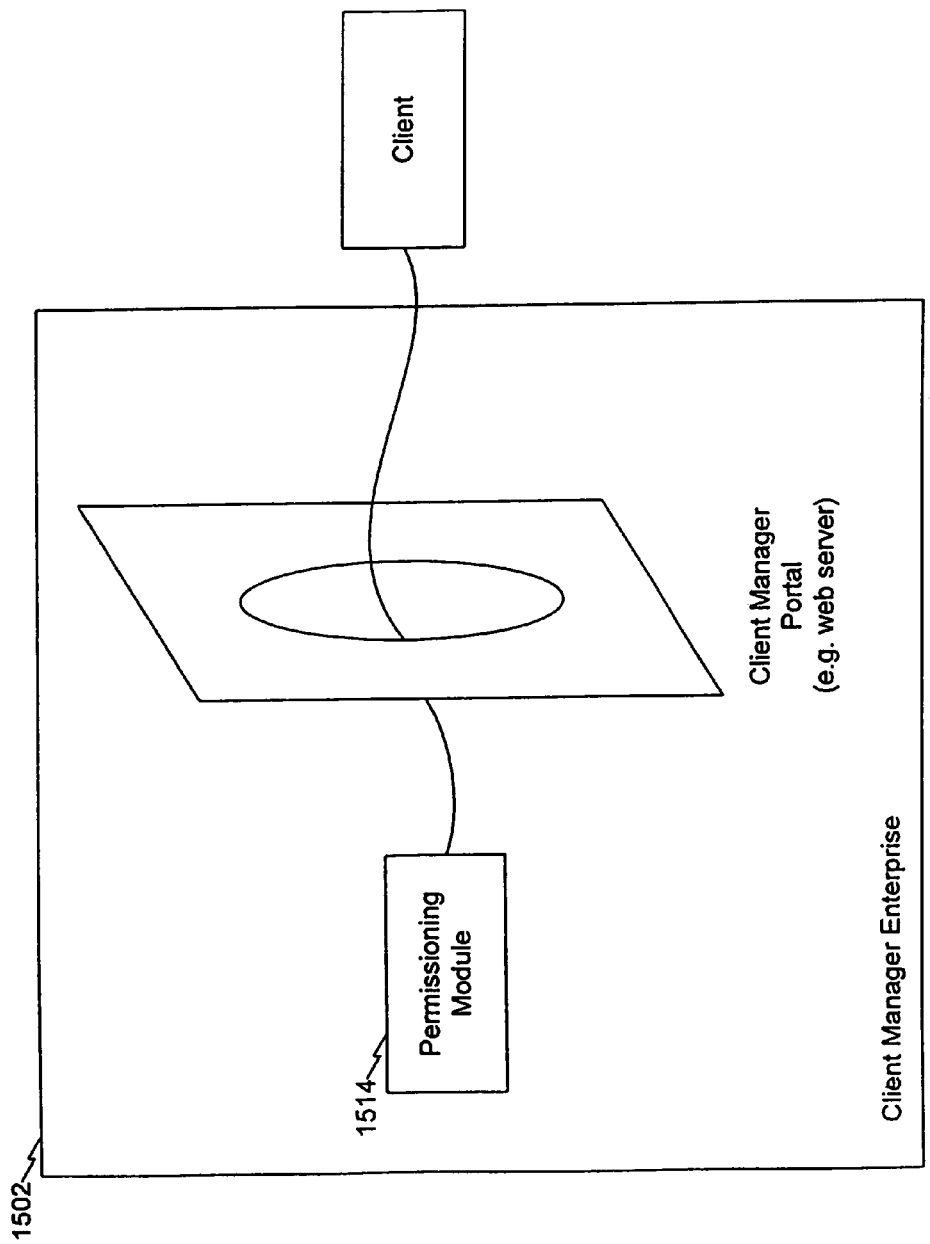
FIG. 15 illustrates an example of a client manager enterprise 1502, including an example permission marketing module 1504, which can be implemented to provide various levels of client permission marketing.
Figure 16:
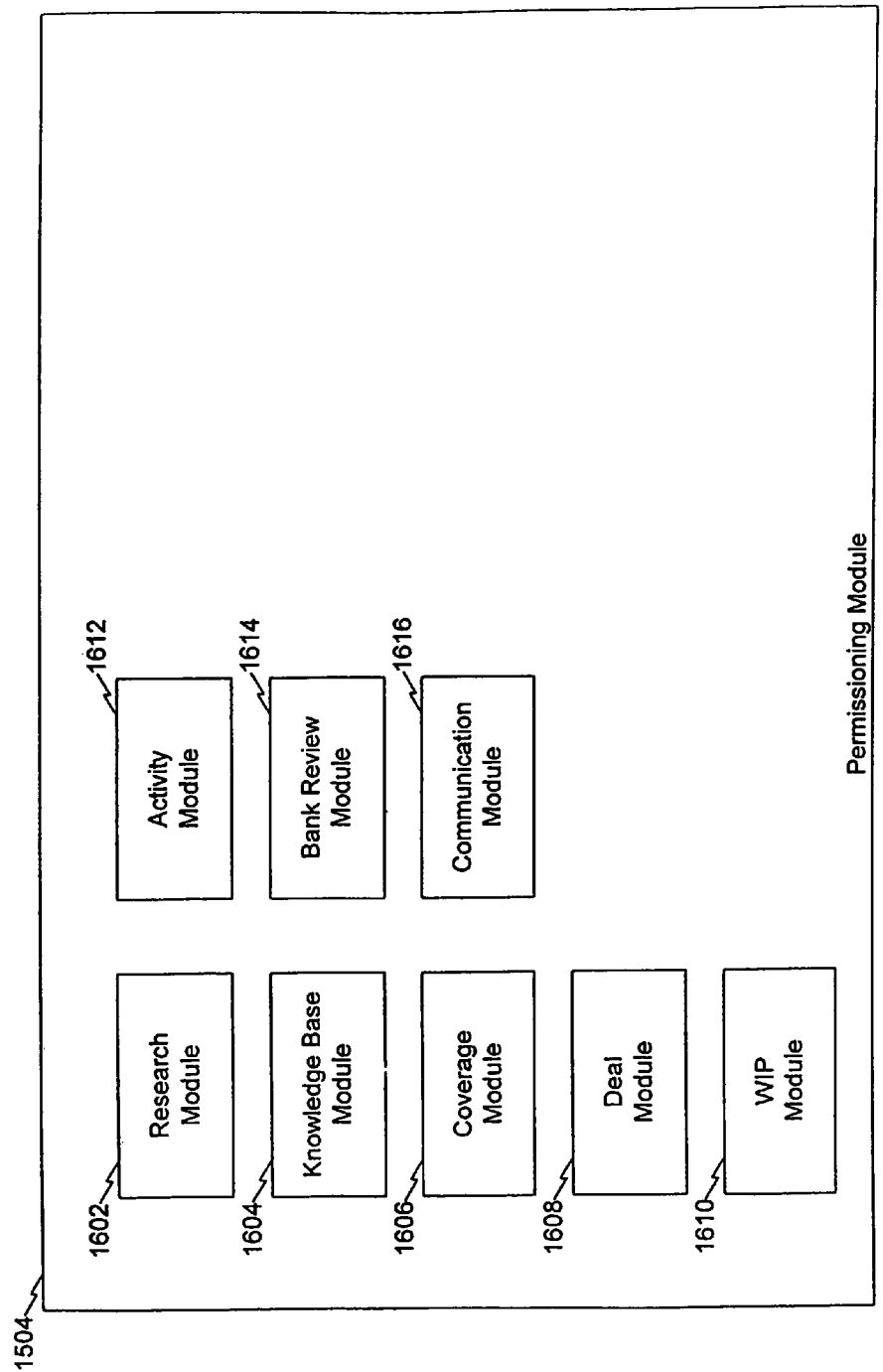
FIG. 16 illustrates an example of a permissioning module 1504.

FIG. 15 illustrates a client manager enterprise 1502, including an example permission marketing module 1504, which can be implemented to provide various levels of client permission marketing. Example implementations of permission marketing module 1504 are provided below. However, permission marketing module 1504 is not limited to the examples provided below. One skilled in the relevant art will understand, based on the description herein, that permission marketing module 1504 can include or omit various features from more than one of the example embodiments provided below.

In a first example embodiment, permission marketing module 1504 is implemented using a catalog of services approach, where the client manager enterprise 1502 posts information on its product offerings, distributes research, and posts contact information. In this embodiment, permission marketing module 1504 provides a substantially one way, read only system to a client.

In a second example embodiment, permission marketing module 1504 is implemented using a client centered approach that is similar to the catalog of services approach described above, but personalized for the client. This example embodiment includes, for example, access to relevant research, summary transaction information etc., prepared for one or more specific clients.

In a third example embodiment, permission marketing module 1504 is implemented using a client centered approach, including two-way dialog for some lines of businesses (LOBs), but were two or more LOBs act independently of one another.

In a fourth example embodiment, permission marketing module 1504 is implemented as a full client strategy center, where there is substantial, if not complete, alignment of client coverage, account management and planning, product execution and delivery. In this embodiment, client manager enterprise 1502 and the client have the full view of each others relationship and value propositions.

1. Integrated Permission Marketing System and Client Manager Portal

Figure 17:
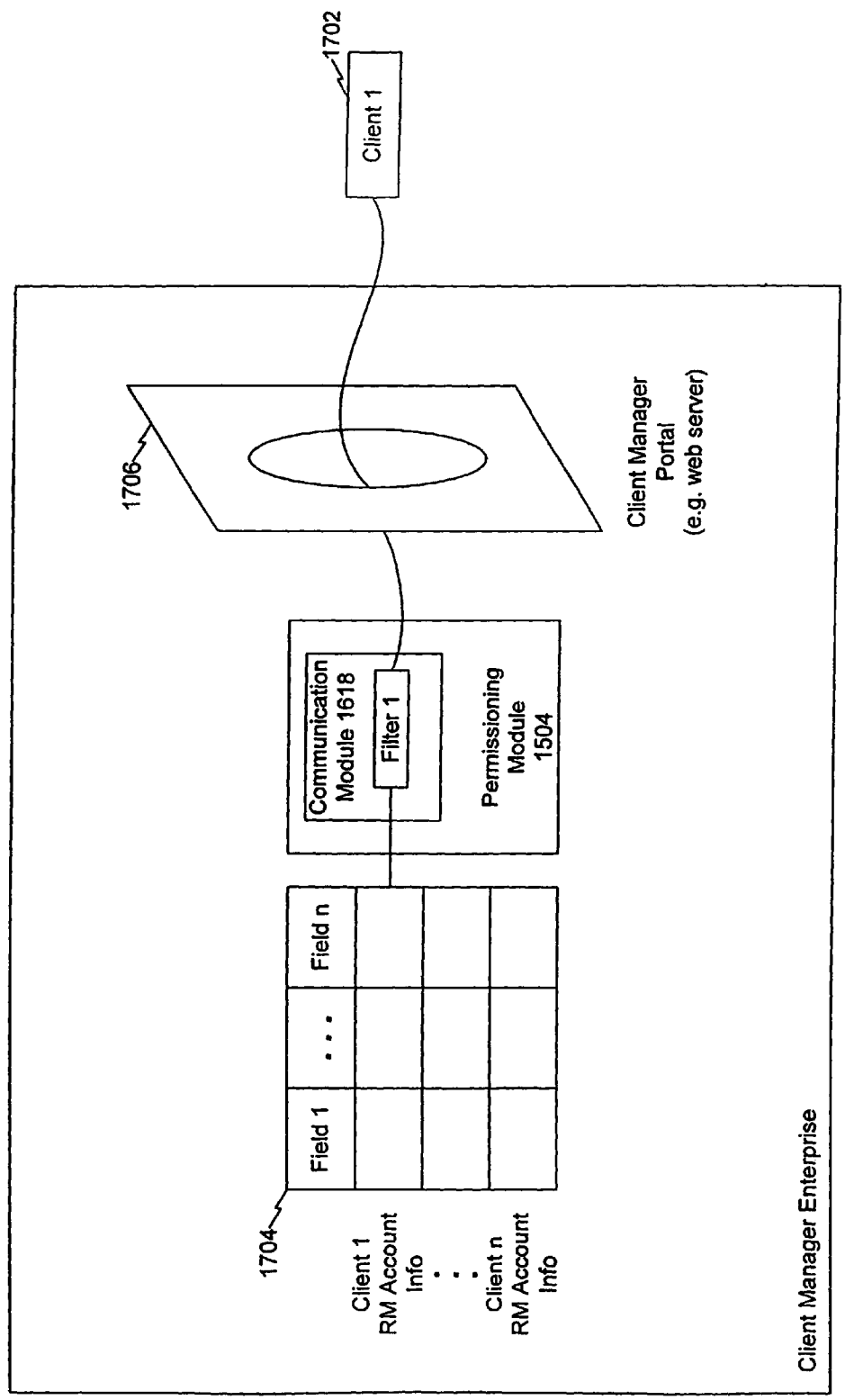
FIG. 17 illustrates an example of permission marketing module 1504 integrated with a client manager portal 1706 in a client manager enterprise 1706.

FIG. 17 illustrates an example of permission marketing module 1504 integrated with a client manager portal 1706 in a client manager enterprise 1706. In this example, permission marketing module 1504 includes communication module 1618, which includes an optional filter 1708, for restricting data fields from the view of a client 1702. Typically, all communications between client enterprise manager 1706 and client 1702, including non-internet communication, are recorded in permission marketing module 1504, and preferably in communication module 1618.

2. Integrated Permission Marketing System and Client Portal

Figure 18:
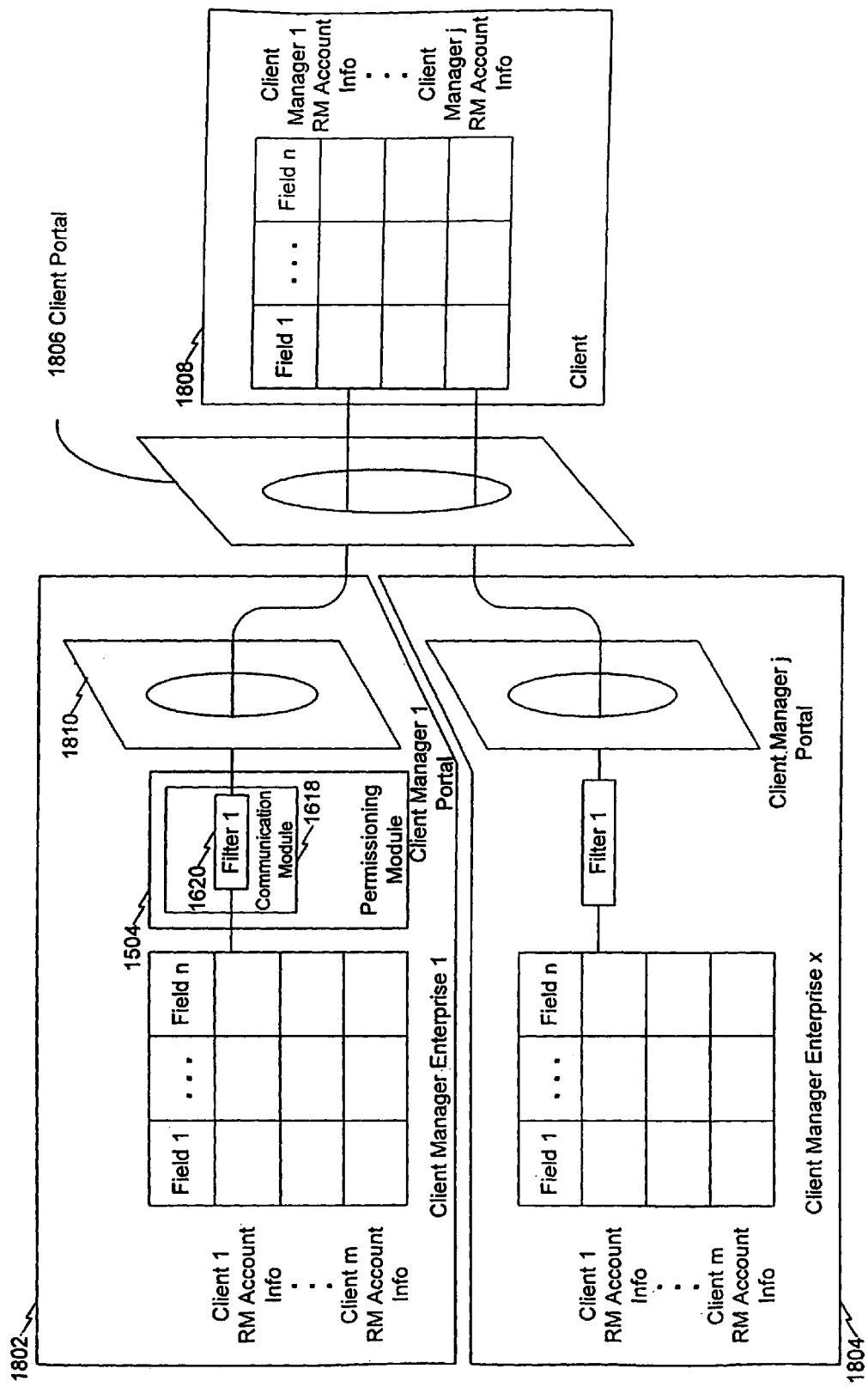
FIG. 18 illustrates an example of permission marketing module 1504 integrated with a client manager portal 1810 and a client portal 1806.
Figure 19:
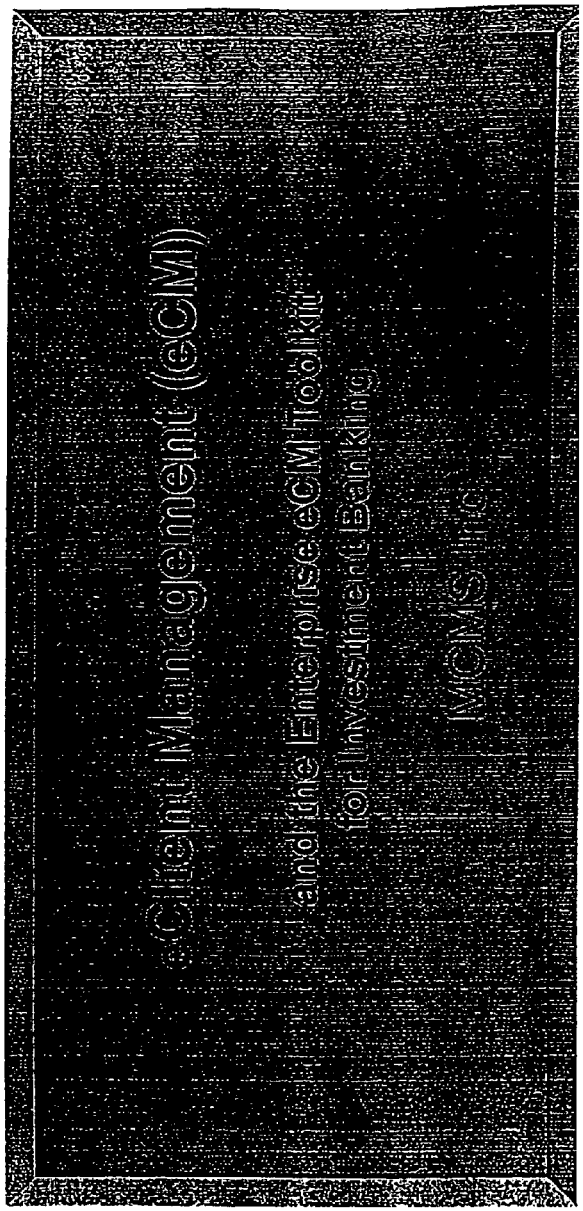
Figure 21:
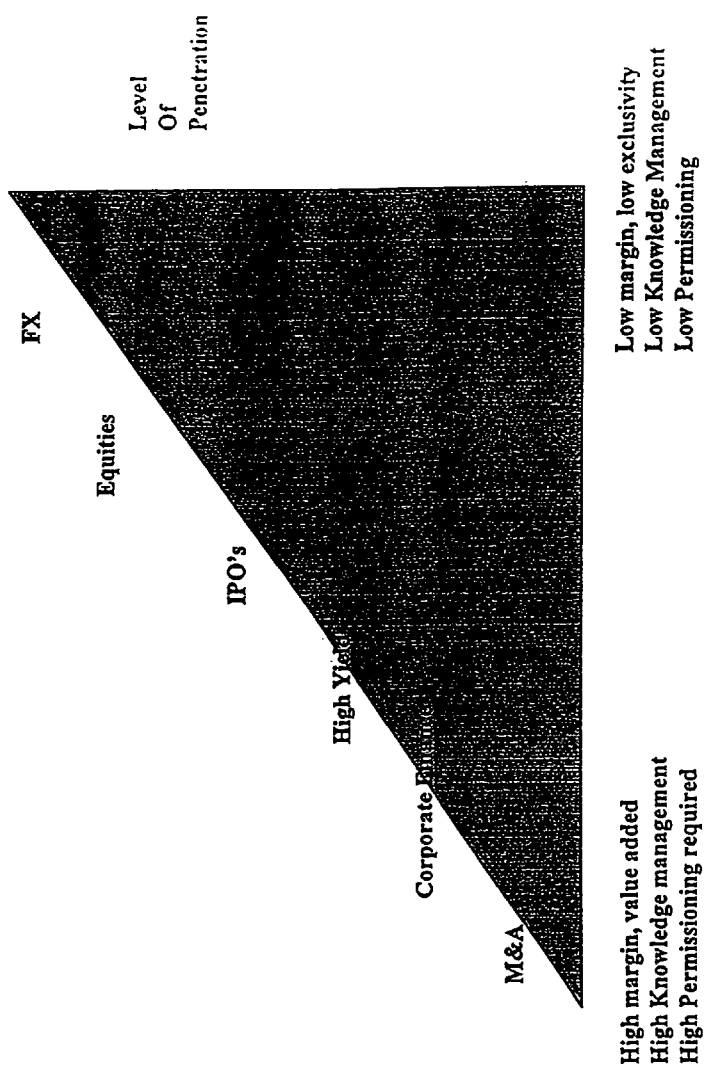
Figure 22:
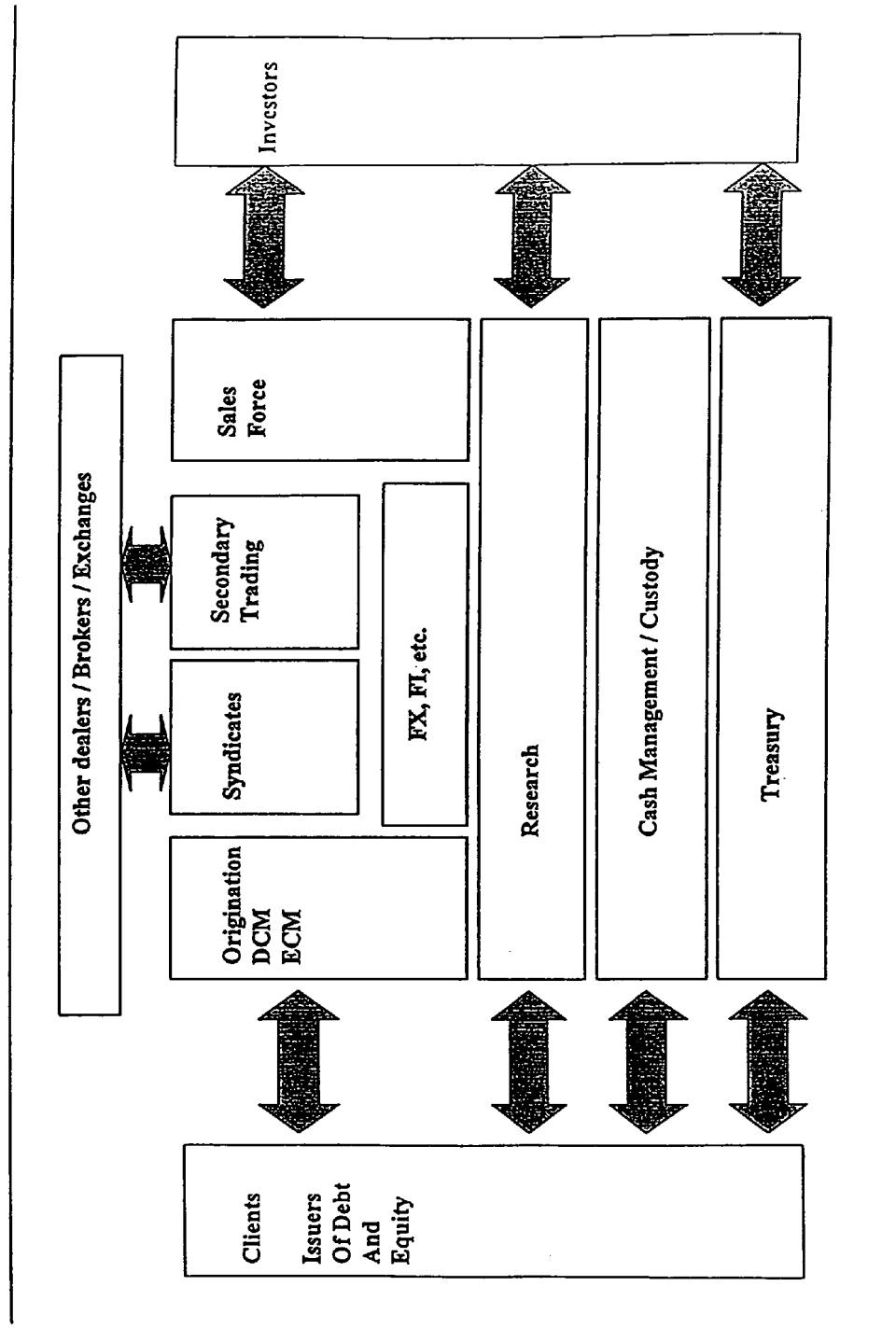
Figure 23:
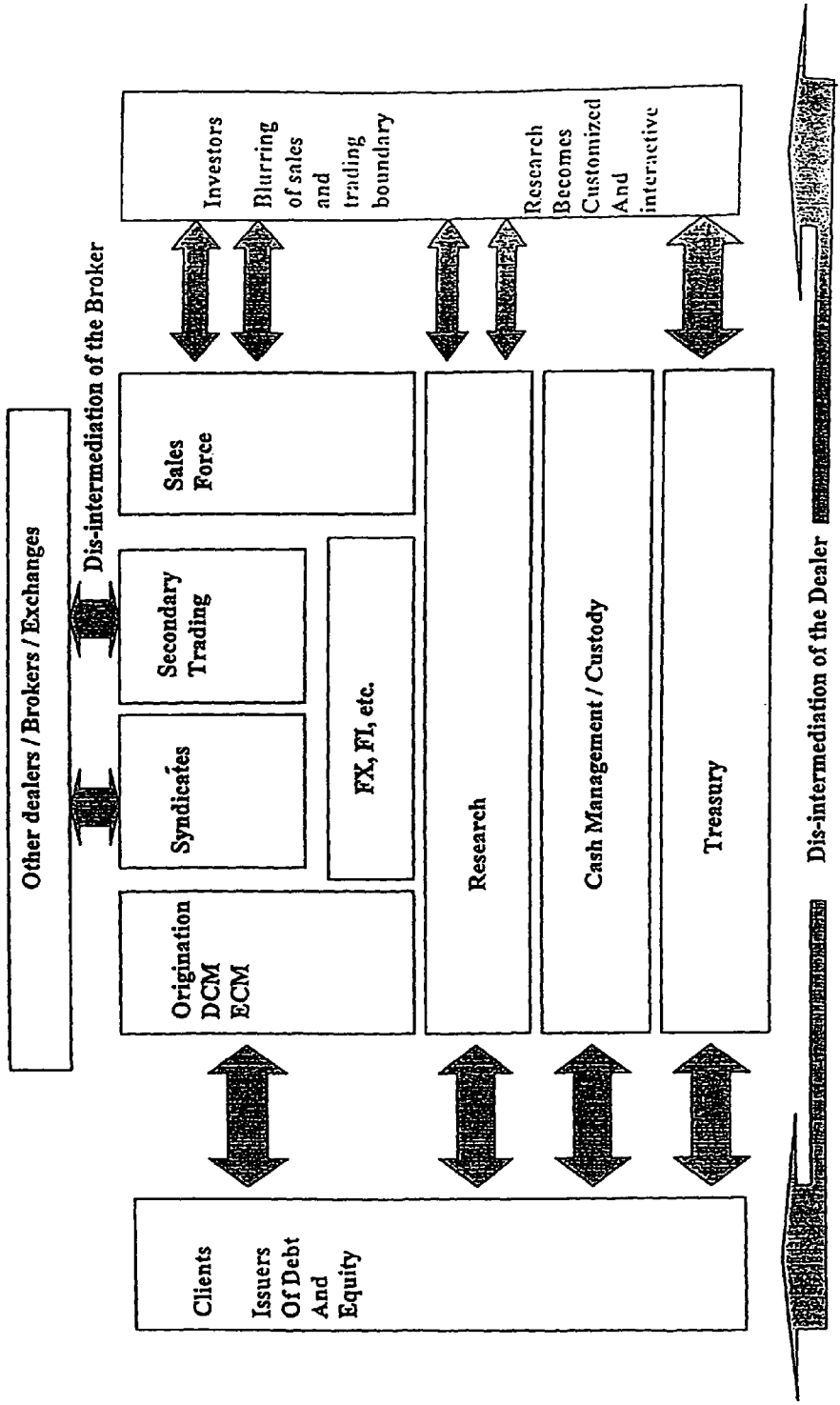
Figure 34:
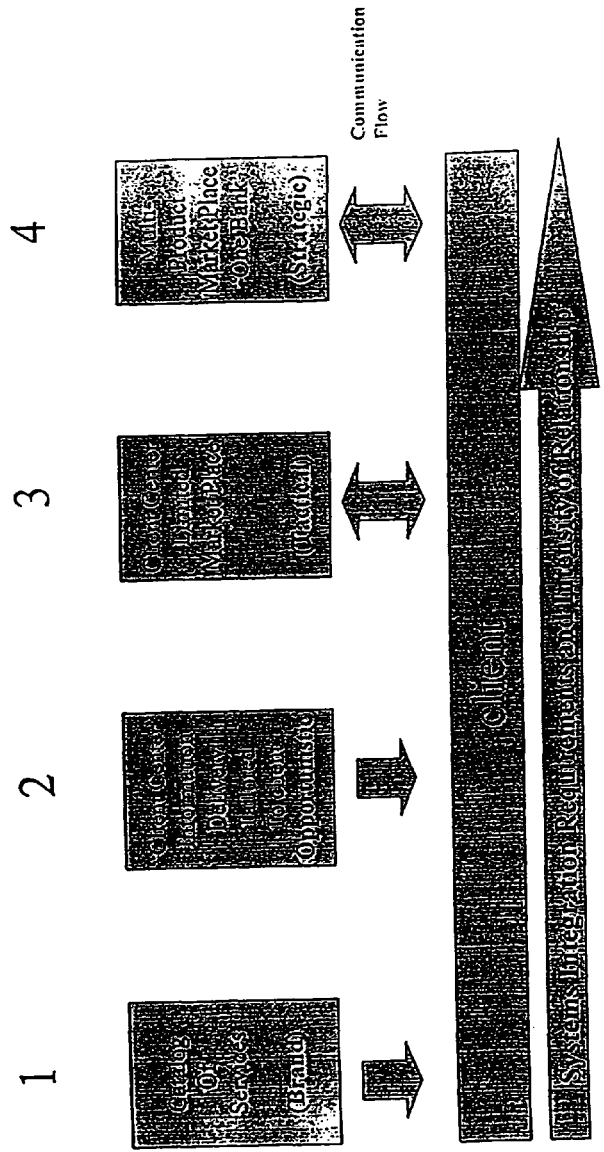
Figure 42:
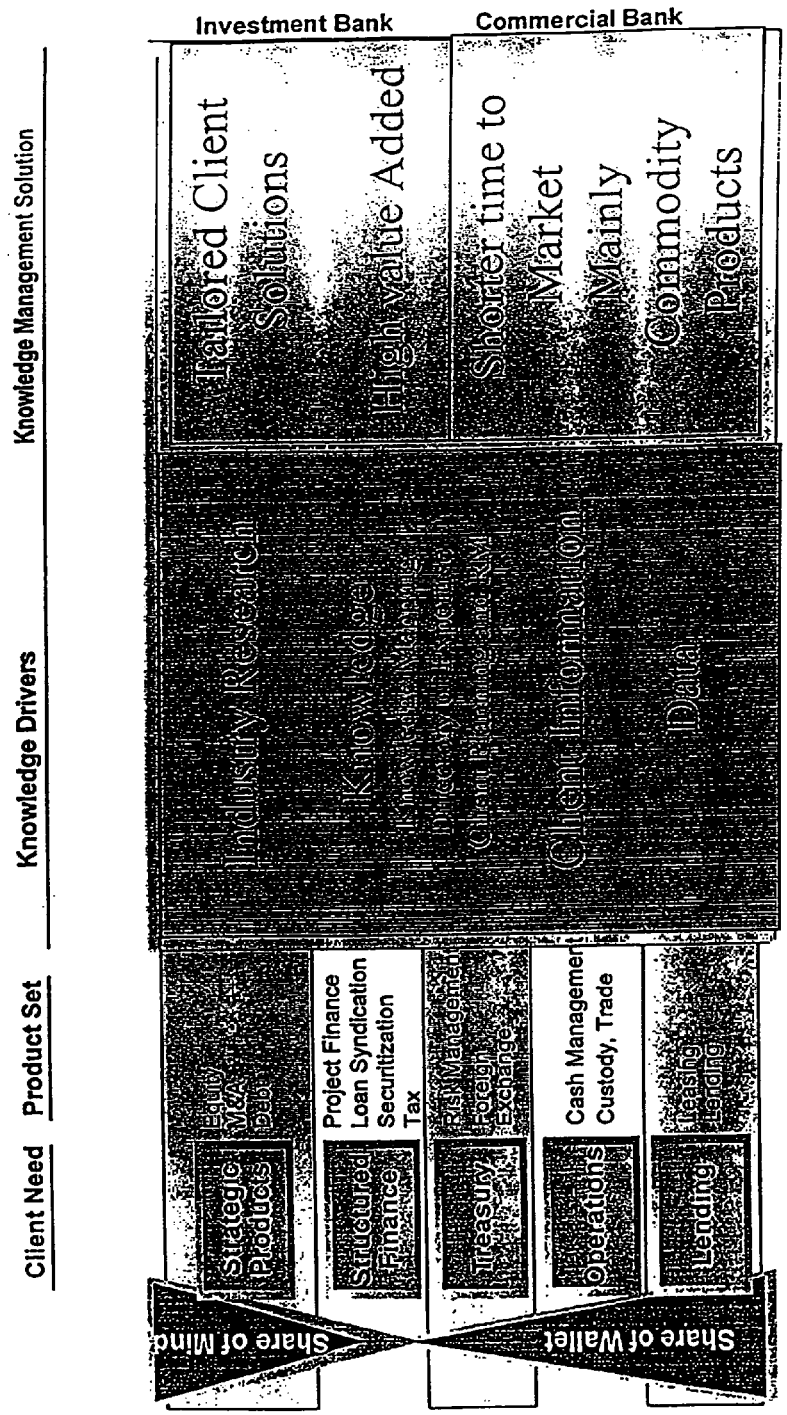
Figure 44:
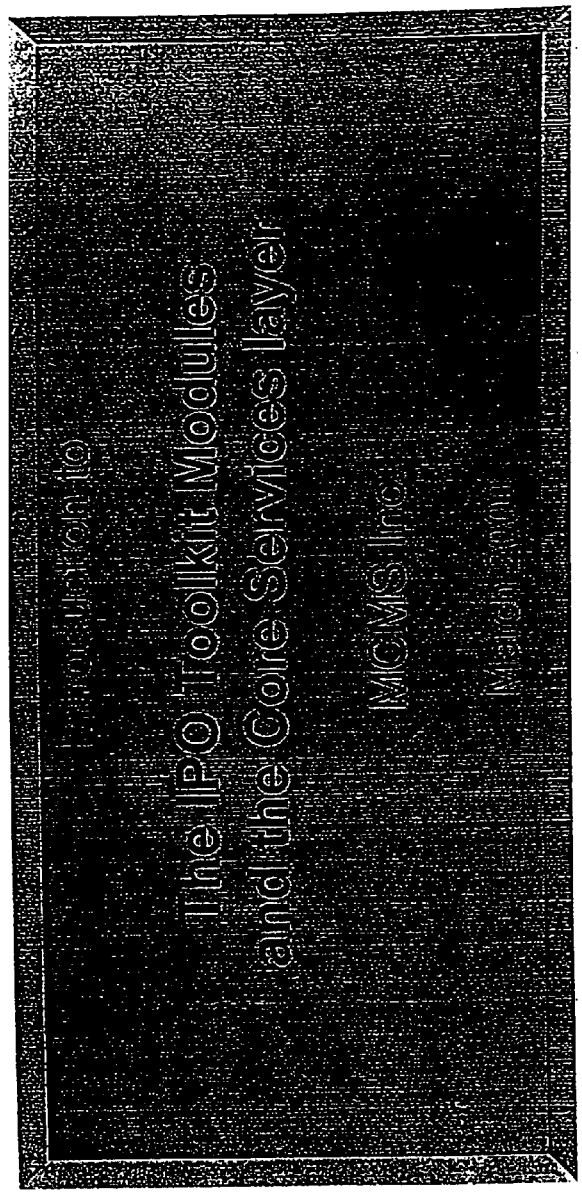
Figure 45:
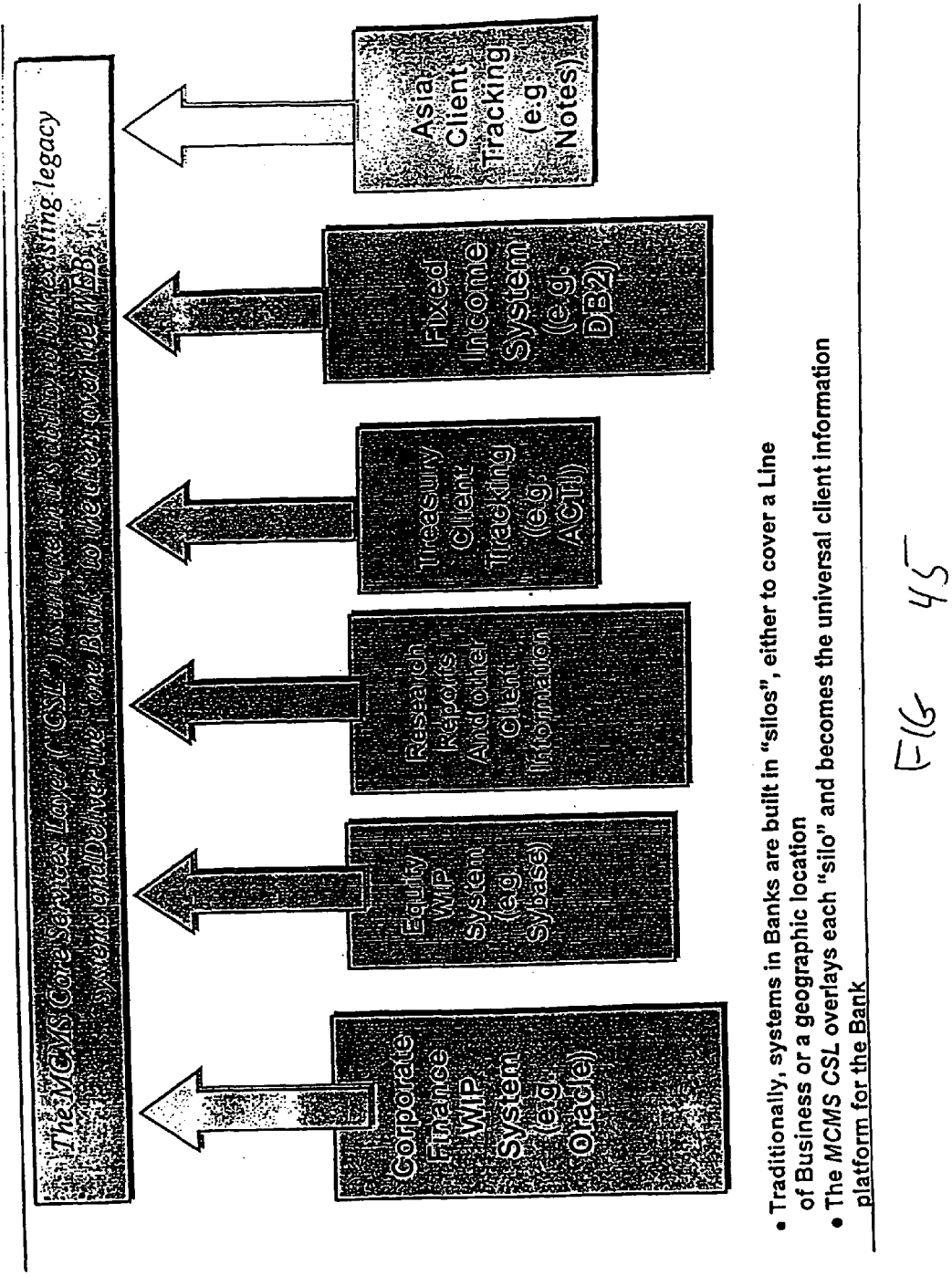

FIG. 18 illustrates an example of permission marketing module 1504 integrated with a client manager portal 1810 and a client portal 1806. Client portal 1806 interfaces a client 1808 with multiple client manager enterprises 1802 through 1804.

In the example of FIG. 18, client manager enterprise 1804 does not include a permission marketing module. In alternative embodiments, client manager enterprise 1804 includes a permission marketing module.

Additional clients can interface with one or more of client manager enterprise 1802 and client manager enterprise 1804 through client portal 1806 or another client portal.

IV. Conclusions

While various embodiments of the Present invention have been described above, it should be understood that they have been presented by way of example only, and not limitation. Thus, the breadth and scope of the Present invention should not be limited by any of the above-described exemplary embodiments, but should be defined only in accordance with the following claims and their equivalents.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. A method of exchanging information between a client and at least one of a plurality of service providers, comprising:

identifying a relationship management system, defining a plurality of client objectives, defining a plurality of permissioning rules associated with each of the plurality of service providers, the permissioning rules defining, for the client and for the service provider, variable levels of access between individuals to different data fields associated with different clients, the data fields being associated with at least one of wallet data, account objectives, client related data, client service team data, deal data and call report data, the permissioning rules enabling two-way access of work flow related relationship management functionality between the client and at least one of the plurality of service providers, the step of defining a plurality of permissioning rules occurring after the step of identifying a relationship management system, organizing information exchanged between the client and at least one of the plurality of service providers in accordance with the permissioning rules, and displaying information exchanged between the client and at least one of the plurality of service providers in accordance with the permissioning rules, wherein at least one of the steps of organizing information and displaying information is implemented using a computer, whereby information exchanged between the client and the service provider is organized in accordance with permissioning rules which affect the work flow.

2. The method of claim 1 wherein the step of defining a plurality of permissioning rules comprises defining a plurality of permissioning rules in accordance with at least one product associated with the service provider.

3. The method of claim 1 wherein the step of defining a plurality of permissioning rules comprises defining a plurality of permissioning rules in accordance with at least one person associated with the service provider.

4. The method of claim 1 wherein the step of defining a plurality of permissioning rules comprises defining a plurality of permissioning rules in accordance with at least one project associated with the service provider.

5. The method of claim 1 wherein the step of defining a plurality of permissioning rules comprises defining a plurality of permissioning rules in accordance with at least one service associated with the service provider.

6. A method of exchanging information between a client and at least one of a plurality of relationship management systems, the at least one of the plurality of relationship management systems being associated with a service provider relationship management system, the method comprising:

defining a plurality of client objectives, defining, via a client portal, a plurality of permissioning rules associated with the service provider, the permissioning rules defining, for the client and for the service provider, variable levels of access between individuals to different data fields associated with different clients, the data fields being associated with at least one of wallet data, account objectives, client related data, client service team data, deal data and call report data, the permissioning rules enabling two-way access of work flow related relationship management functionality between the client and at least one of the plurality of service providers, the step of defining a plurality of permissioning rules occurring after the step of identifying a relationship management system, organizing information exchanged between the client and the service provider in accordance with the permissioning rules, and displaying, via a client portal, the information exchanged between the client and the service provider in accordance with the permissioning rules, wherein at least one of the steps of organizing information and displaying information is implemented using a computer, whereby information exchanged between the client and the service provider is organized in accordance with permissioning rules which affect the work flow.

7. The method of claim 6 wherein the step of defining a plurality of permissioning rules comprises the step of introducing into a client portal a field associated with a service provider relationship management system.

8. The method of claim 6 wherein the step of displaying, via a client portal, the information exchanged between the client and the service provider in accordance with the permissioning rules comprises limiting the displayed information to information which the client wishes the service provider to observe.

* * * * *